(12) United States Patent
Liu et al.

(10) Patent No.: US 11,824,709 B2
(45) Date of Patent: Nov. 21, 2023

(54) NETWORK MANAGEMENT METHOD AND DEVICE

(71) Applicant: HUAWEI TECHNOLOGIES CO., LTD., Shenzhen (CN)

(72) Inventors: Jinliang Liu, Shenzhen (CN); Xinzong Zeng, Beijing (CN); Fengqing Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 17/579,973

(22) Filed: Jan. 20, 2022

(65) Prior Publication Data

US 2022/0141089 A1 May 5, 2022

Related U.S. Application Data

(63) Continuation of application No. PCT/CN2020/111700, filed on Aug. 27, 2020.

(30) Foreign Application Priority Data

Aug. 30, 2019 (CN) .......................... 201910816847.X

(51) Int. Cl.
*H04L 41/0806* (2022.01)
*H04L 61/5007* (2022.01)
(Continued)

(52) U.S. Cl.
CPC ...... *H04L 41/0806* (2013.01); *H04L 41/0886* (2013.01); *H04L 45/02* (2013.01); *H04L 45/302* (2013.01); *H04L 61/5007* (2022.05)

(58) Field of Classification Search
None
See application file for complete search history.

(56) References Cited

U.S. PATENT DOCUMENTS

2003/0120822 A1* 6/2003 Langrind ............ H04L 61/5092
709/251
2006/0015513 A1 1/2006 Poyhonen et al.
(Continued)

FOREIGN PATENT DOCUMENTS

CN 103067207 A 4/2013
CN 103428306 A 12/2013
(Continued)

*Primary Examiner* — Christopher B Robinson
(74) *Attorney, Agent, or Firm* — Maier & Maier, PLLC

(57) ABSTRACT

A network management method includes a control device that receives information indicating that a device goes online, where the information indicating that a device goes online includes position information of an online device. The control device determines, based on the position information of the online device, that the online device belongs to a first fabric plane of a network topology within a network range managed by the access control device, where the network topology is planned as at least one fabric plane, and a forwarding resource associated with the first fabric plane is isolated from a forwarding resource outside the first fabric plane. The control device determines, based on the first fabric plane, configuration information of the online device, and sends the configuration information to the online device, where the configuration information is used by the online device to perform automatic online configuration.

20 Claims, 23 Drawing Sheets

(51) Int. Cl.
*H04L 41/08* (2022.01)
*H04L 45/02* (2022.01)
*H04L 45/302* (2022.01)

(56) References Cited

U.S. PATENT DOCUMENTS

| | | | |
|---|---|---|---|
| 2012/0151572 A1 | 6/2012 | Ringen | |
| 2013/0151646 A1* | 6/2013 | Chidambaram | H04L 49/9094 709/213 |
| 2014/0244808 A1 | 8/2014 | Axelrod et al. | |
| 2016/0294607 A1 | 10/2016 | Davis | |
| 2017/0289035 A1 | 10/2017 | Wang | |
| 2018/0351791 A1* | 12/2018 | Nagarajan | H04L 41/0895 |
| 2018/0367412 A1* | 12/2018 | Sethi | H04L 43/10 |
| 2018/0367449 A1* | 12/2018 | Pani | H04L 41/40 |

FOREIGN PATENT DOCUMENTS

| | | |
|---|---|---|
| CN | 106161077 A | 11/2016 |
| CN | 108062231 A | 5/2018 |
| CN | 108667638 A | 10/2018 |
| CN | 109218052 A | 1/2019 |
| WO | 2016160420 A1 | 10/2016 |
| WO | 2019140486 A1 | 7/2019 |

\* cited by examiner

NETWORK MANAGEMENT METHOD AND DEVICE

CROSS-REFERENCE TO RELATED APPLICATIONS

This application is a continuation of International Application No. PCT/CN2020/111700, filed on Aug. 27, 2020, which claims priority to Chinese Patent Application No. 201910816847.X, filed on Aug. 30, 2019. The disclosures of the aforementioned applications are hereby incorporated by reference in their entireties.

FIELD

The embodiments relate to the field of communications technologies, and, to a network management method and a device.

BACKGROUND

With an increase of network requirements, a quantity of devices on a network may increase, and a network structure becomes increasingly complex. A bearer network is used as an example Compared with that in 4th generation (4G) mobile communication, a quantity of devices on a bearer network in 5th generation (5G) mobile communication significantly increases, typically, about 20,000 network element devices. In addition, due to complexity and diversity of traffic requirements, a quantity of services increases greatly. A conventional management, operation, and maintenance method cannot cope with such a large quantity of managed objects.

Therefore, a network management problem needs to be resolved urgently.

SUMMARY

Embodiments provide a network management method, so as to perform automatic online management on devices in a network based on a fabric plane of the network. The embodiments further provide a corresponding control device.

A first aspect provides a network management method. The network management method may include: A control device receives information indicating that a device goes online, where the information indicating that a device goes online includes position information of an online device; the control device determines, based on the position information of the online device, that the online device belongs to or accesses a first fabric plane of a network topology within a network range managed by the control device, where the network topology is planned as at least one fabric plane, and a forwarding resource associated with the first fabric plane is isolated from a forwarding resource outside the first fabric plane; the control device determines configuration information of the online device based on the first fabric plane; the control device determines the configuration information of the online device based on the position information of the online device; and the control device sends the configuration information to the online device, where the configuration information is used by the online device to perform automatic online configuration.

In the first aspect, the network range managed by the control device may be a province, or may be a city, and the network usually refers to a network within a particular physical range. A forwarding resource managed by a fabric plane is isolated from a forwarding resource outside the fabric plane to avoid service cross-connection. In this way, a multi-purpose network is effectively implemented. The position information may be interface information of another device connected to the online device, or other information that can express a position of the online device. In the first aspect, based on the fabric plane, after the device goes online, the control device may determine the configuration information for the online device, where the configuration information is used for automatic online configuration of the online device. In this way, automatic management of the online device is implemented, and network management efficiency is improved.

In a possible implementation of the first aspect, when the first fabric plane belongs to a bearer network, the first fabric plane includes an aggregation-type fabric area and an access-type fabric area; when the first fabric plane belongs to a single-layer network, the first fabric plane includes a default-type fabric area; when the first fabric plane belongs to a data center (DC) network, the first fabric plane includes a DC-type fabric area; or when the first fabric plane belongs to a cloud-network synergy network, the first fabric plane includes: an aggregation-type fabric area, an access-type fabric area, and a DC-type fabric area.

In this possible implementation, the cloud-network synergy network may be understood as a combination of the bearer network and the DC network. Fabric planes of networks with different structures contain different types of fabric areas. This may ensure that networks with different structures have appropriate fabric areas to implement automatic management.

In a possible implementation of the first aspect, when the first fabric plane belongs to the bearer network or the cloud-network synergy network, and the online device is a first access device in the access-type fabric area, the method may further include: The control device obtains template filtering information. That the control device determines configuration information of the online device based on the first fabric plane may include: The control device determines, based on position information of the first access device, a first access-type fabric area to which the first access device belongs, and a role of the first access device in the first fabric area; the control device determines an online parameter template of the first access device and a preset network element login parameter based on the template filtering information; the control device allocates an interior gateway protocol (IGP) process number of the first access device, a link internet protocol (IP) address of the first access device, an identifier of the first access device, or a name of the first access device based on the first fabric area, where all devices included in the first fabric area belong to a same IGP domain. The control device fills the preset network element login parameter, a role of the first access device, the IGP process number, the link IP address of the first access device, the identifier of the first access device, or the name of the first access device into the online parameter template, to obtain configuration information used by the first access device to go online.

In this possible implementation, the template filtering information may be public network information or private network information, and each type of template filtering information corresponds to one online parameter template. The preset network element login parameter may be a username, a password, and the like. The identifier of the first access device may alternatively be the IP address of the first access device. The IGP domain refers to an IGP range. For going online of the first access device in the access-type fabric area, the control device generates, for the first access device, configuration information that is suitable for a device that goes online in the access-type fabric area, so that automatic online configuration can be performed on the device in the area, automatic management of the online device is implemented, and network management efficiency is improved.

In a possible implementation of the first aspect, the method may further include: When a second access device in the first fabric area goes offline, the control device determines changed configuration information of a changed network element, where the changed network element is a network element whose configuration information changes because the second access device goes offline; and the control device sends the changed configuration information to the changed network element, where the changed configuration information is used by the changed network element to perform automatic update configuration.

In this possible implementation, that the second access device goes offline may be that the device is removed or may be that an interface on the device is damaged, or may be that a link is faulty, or the like. When a device goes offline in the network, a link relationship is changed, and some network elements related to the second access device are affected. In this case, configuration information of these related network elements needs to be updated, and the control device re-determines, for these changed network elements, changed configuration information for updating. In this way, when the network changes, device configurations can be automatically updated, and automatic network management is implemented.

In a possible implementation of the first aspect, when the first fabric plane belongs to the bearer network or the cloud-network synergy network, the online device is a first base station in the access-type fabric area, the position information is interface information of a third access device connected to the first base station in the access-type fabric area, and the online information further includes an electronic serial number (ESN) of the first base station, the foregoing step that the control device determines the configuration information of the online device based on the position information of the online device may include:

The control device determines the configuration information based on the interface information of the third access device and the ESN of the first base station, where the configuration information includes: a first IP address and a first mask that are allocated to the first base station based on the first fabric plane, and a second IP address and a second mask that are allocated to an interface indicated by the interface information, and the first IP address and the second IP address belong to a same network segment.

The foregoing step that the control device sends the configuration information to the online device, where the configuration information is used by the online device to perform automatic online configuration may include:

The control device sends the ESN, the first IP address, and the first mask of the first base station to a dynamic host configuration protocol (DHCP) server, where the first IP address and the first mask are transmitted by the DHCP server to the first base station by using the third access device, and the first IP address and the first mask are used by the first base station to perform automatic online configuration; and the control device sends the second IP address and the second mask to the third access device, where the second IP address and the second mask are used by the interface of the third access device to perform interworking configuration with the first base station.

In this possible implementation, when the base station goes online, the control device generates respective IP addresses and masks for the base station and an interface of a device connected to the base station, so as to implement communication between the base station and the bearer network, and provide assurance for virtual private network (VPN) service deployment.

In a possible implementation of the first aspect, the method may further include:

The control device obtains, based on the ESN of the first base station, a first available traffic model that is based on the first fabric plane of the bearer network, where the first available traffic model includes a traffic sub-model for communication between a base station and the internet, a network management traffic sub-model, and a traffic sub-model for communication between base stations;

the control device determines function requirements of different network elements on the first fabric plane based on the first available traffic model, and determines at least one service path that is on the first fabric plane and that satisfies a virtual private network VPN service deployed by using the first base station, where different function requirements correspond to different traffic sub-models, and each traffic sub-model corresponds to one set of configuration templates;

the control device determines, from the at least one service path, an optimal path that meets a service level agreement (SLA) requirement of the VPN service;

the control device generates network element configuration information for a key network element on the optimal path based on the function requirements of the different network elements, where the network element configuration information includes a configuration template corresponding to a traffic sub-model to which the key network element belongs; and the control device sends the network element configuration information to the key network element, where the network element configuration information is used by the key network element to perform automatic configuration.

In this possible implementation, the key network element may be a start network element and an end network element on the optimal path or may be another network element. The VPN service can be deployed through the base station to implement automatic service configuration.

In a possible implementation of the first aspect, when the first fabric plane belongs to the single-layer network, and the online device is a fourth access device in the default-type fabric area, the foregoing step that the control device determines configuration information of the online device based on the first fabric plane may include:

The control device determines the configuration information for the fourth access device based on the first fabric plane, where the configuration information includes an IGP process number of the fourth access device, a link IP address of the fourth access device, an identifier of the fourth access device, or a name of the fourth access device.

In this possible implementation, for a relatively simple single-layer network, the control device may allocate a resource to the fourth access device based on a resource pool associated with the first fabric plane, to determine the configuration information of the fourth access device.

In a possible implementation of the first aspect, the method may further include:

When a fifth access device in the default-type fabric area goes offline, the control device determines changed configuration information of a changed network element, where the changed network element is a network element whose configuration information changes because the fifth access device goes offline; and the control device sends the changed configuration information to the changed network element, where the changed configuration information is used by the changed network element to perform automatic update configuration.

In this possible implementation, that the fifth access device goes offline may be that the device is removed or may be that an interface on the device is damaged, or may be that a link is faulty, or the like. When a device goes offline in the network, a link relationship is changed, and some network elements related to the fifth access device are affected. In this case, configuration information of these related network elements needs to be updated, and the control device redetermines, for these changed network elements, changed configuration information for updating. In this way, when the network changes, device configurations can be automatically updated, and automatic network management is implemented.

In a possible implementation of the first aspect, when the first fabric plane belongs to the DC network or the cloud-network synergy network, the online device is a first virtual machine VM in the DC-type fabric area, the position information is information about a first interface of a sixth access device connected to the first virtual machine in the DC-type fabric area, and the information about the device goes online further includes an ESN of a server in which the first VM is located, an identifier of the first VM, and a medium access control MAC address of the first VM, the foregoing step that the control device determines configuration information of the online device based on the first fabric plane may include:

The control device establishes a correspondence between the first logical interface and the first interface based on the identifier of the first VM, the information about the first interface, and a pre-recorded correspondence between the identifier of the first VM and a first logical interface; and the control device determines the configuration information for the first VM based on the information about the first interface, the ESN of the server in which the first VM is located, the identifier of the first VM, and the MAC address of the first VM, where the configuration information includes a third IP address.

The foregoing step that the control device sends the configuration information to the online device, where the configuration information is used by the online device to perform automatic online configuration may include:

The control device sends the identifier of the first VM and the third IP address to a DHCP server, where the third IP address is transmitted by the DHCP server to the first VM by using the sixth access device, and the third IP address is used by the first VM to perform automatic online configuration.

In this possible implementation, when the first fabric plane belongs to the DC network, the control device may perform automatic online management on the VM and provide a basis for service deployment on the VM.

In a possible implementation of the first aspect, the method may further include:

The control device obtains, based on the ESN of the server in which the first VM is located, a second available traffic model that is based on the first fabric plane, where the second available traffic model includes a traffic sub-model for communication between the VM and the internet and a traffic sub-model for communication between VMs;

the control device determines function requirements of different network elements on the first fabric plane based on the second available traffic model, and determines M service paths of a VPN service deployed by using the first VM on the first fabric plane, where the different function requirements correspond to different traffic sub-models, each traffic sub-model corresponds to one set of configuration templates, and M is an integer greater than 0;

the control device determines, from the M service paths, a first optimal path that meets an SLA requirement of the VPN service;

the control device generates first network element configuration information for a first key network element on the first optimal path based on the function requirements of the different network elements, where the first network element configuration information includes a configuration template corresponding to a traffic sub-model to which the first key network element belongs; and the control device sends the first network element configuration information to the first key network element, where the first network element configuration information is used by the first key network element to perform automatic configuration.

In this possible implementation, the key network element may be a start network element and an end network element on the optimal path or may be another network element. The VPN service can be deployed through the VM to implement automatic service configuration.

In a possible implementation of the first aspect, the method may further include:

If obtaining that the first VM is migrated to a second interface, the control device deletes the correspondence between the first logical interface and the first interface, where the second interface is an interface on the sixth access device or a seventh access device;

the control device determines, based on the second interface, N service paths of the VPN service deployed by using the first VM after the migration on the first fabric plane, where the different function requirements correspond to different traffic sub-models, each traffic sub-model corresponds to one set of configuration templates, and N is an integer greater than 0;

the control device determines, from the N service paths, a second optimal path that meets the SLA requirement of the VPN service;

the control device generates second network element configuration information for a second key network element on the second optimal path based on the function requirements of the different network elements, where the second network element configuration information includes a configuration template corresponding to a traffic sub-model to which the second key network element belongs; and the control device sends the second network element configuration information to the second key network element, where the first network element configuration information is used by the first key network element to perform automatic configuration.

In this possible implementation, after the VM is migrated, a service deployed on the VM is also migrated at any time.

In a possible implementation of the first aspect, the method may further include:

The control device further obtains a requirement of a service level agreement SLA of the service; and the control device determines at least one fabric plane based on the requirement of the SLA, where requirements of different SLAs correspond to different fabric planes.

In a possible implementation of the first aspect, the method may further include:

The control device obtains first intent information corresponding to a first fabric plane, where the first intent information includes information about a pair of core aggregation network elements on the first fabric plane and a first interior gateway protocol IGP process identifier of the pair of core aggregation network elements, and the first fabric plane is any one of the at least one fabric plane;

the control device searches, based on the information about the pair of core aggregation network elements, the first fabric plane for a network element and a link that are in the same IGP domain as the first IGP process identifier starting from the pair of core aggregation network elements, so as to determine an aggregation-type fabric area, where a topology view of the aggregation-type fabric area is a connection sub-diagram in a connection diagram of the first fabric plane; and the control device determines at least one access-type fabric area based on the aggregation-type fabric area.

In a possible implementation of the first aspect, the foregoing step that the control device determines at least one access-type fabric area based on the aggregation-type fabric area may include:

The control device determines a role of each network element in the aggregation-type fabric area;

the control device subtracts a link in the aggregation-type fabric area from the first fabric plane, to obtain at least one sub-diagram that is not connected to each other; and for each disconnection sub-diagram, the control device searches for a network element and a link that are in the same IGP domain as a second IGP process identifier starting from a first network element in the aggregation-type fabric area, so as to obtain the at least one access-type fabric area, where the first network element and the link, and the network element and the link that are in the same IGP domain as the second IGP process identifier form a connection sub-diagram, access-type fabric areas formed by different disconnection sub-diagrams have different IGP domains, and the first network element is any access network element whose quantity of connecting sides is greater than 2.

In a possible implementation of the first aspect, the foregoing step that the control device determines at least one access-type fabric area based on the aggregation-type fabric area may include:

The control device determines a role of each network element in the aggregation-type fabric area;

the control device obtains second intent information of the aggregation-type fabric area, where the second intent information includes information about at least one pair of access network elements in the aggregation-type fabric area and an IGP process identifier corresponding to each pair of access network elements; and the control device searches, based on information about a first pair of access network elements, for a network element and a link that are in the same IGP domain as a third IGP process identifier corresponding to the first pair of access network elements starting from the first pair of access network elements on the first fabric plane, so as to determine the access-type fabric area corresponding to the third IGP process identifier, where the first pair of access network elements are any pair of the at least one pair of access network elements, and each pair of access network elements correspond to a different IGP process identifier.

A second aspect provides a control device, configured to perform the method in any one of the first aspect or the possible implementations of the first aspect. The control device may include modules or units configured to perform the method according to any one of the first aspect or the possible implementations of the first aspect.

A third aspect provides a control device, including at least one processor, a memory, a transceiver, and computer-executable instructions that are stored in the memory and that can be run on the processor. When the computer-executable instructions are executed by the processor, the processor performs the method according to any one of the first aspect or the possible implementations of the first aspect.

A fourth aspect provides a computer-readable storage medium storing one or more computer-executable instructions. When the computer-executable instructions are executed by a processor, the processor performs the method according to any one of the first aspect or the possible implementations of the first aspect.

A fifth aspect provides a computer program product storing one or more computer-executable instructions. When the computer-executable instructions are executed by a processor, the processor performs the method according to any one of the first aspect or the possible implementations of the first aspect.

The control device described in the second aspect to the fifth aspect may also be a chip applied to the control device, or another combined device, component, or the like that has a function of the control device.

For effects brought by any one of the second aspect to the fifth aspect or the possible implementations of the second aspect to the fifth aspect, refer to effects brought by the first aspect or the different possible implementations of the first aspect. Details are not described herein again.

DETAILED DESCRIPTION OF THE EMBODIMENTS

The following describes embodiments with reference to the accompanying drawings. It is clear that the described embodiments are merely some rather than all of the embodiments. A person of ordinary skill in the art may understand that as a technology evolves and a new scenario emerges, the solutions provided in the embodiments are also applicable to a similar problem.

In the embodiments and accompanying drawings, the terms "first", "second", and so on are intended to distinguish between similar objects but do not necessarily indicate an order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units but may include other units not expressly listed or inherent to such a process, method, system, product, or device.

Embodiments provide a network management method, so as to perform automatic online management on a device and a service in a network based on a fabric plane of the network. The embodiments further provide a corresponding control device. The following provides descriptions in detail.

In this embodiment, to implement more automated network management, a network may be divided into different fabric planes. Each fabric plane can be divided into a plurality of different fabric areas based on a pre-planned network hierarchy.

Figure 1:
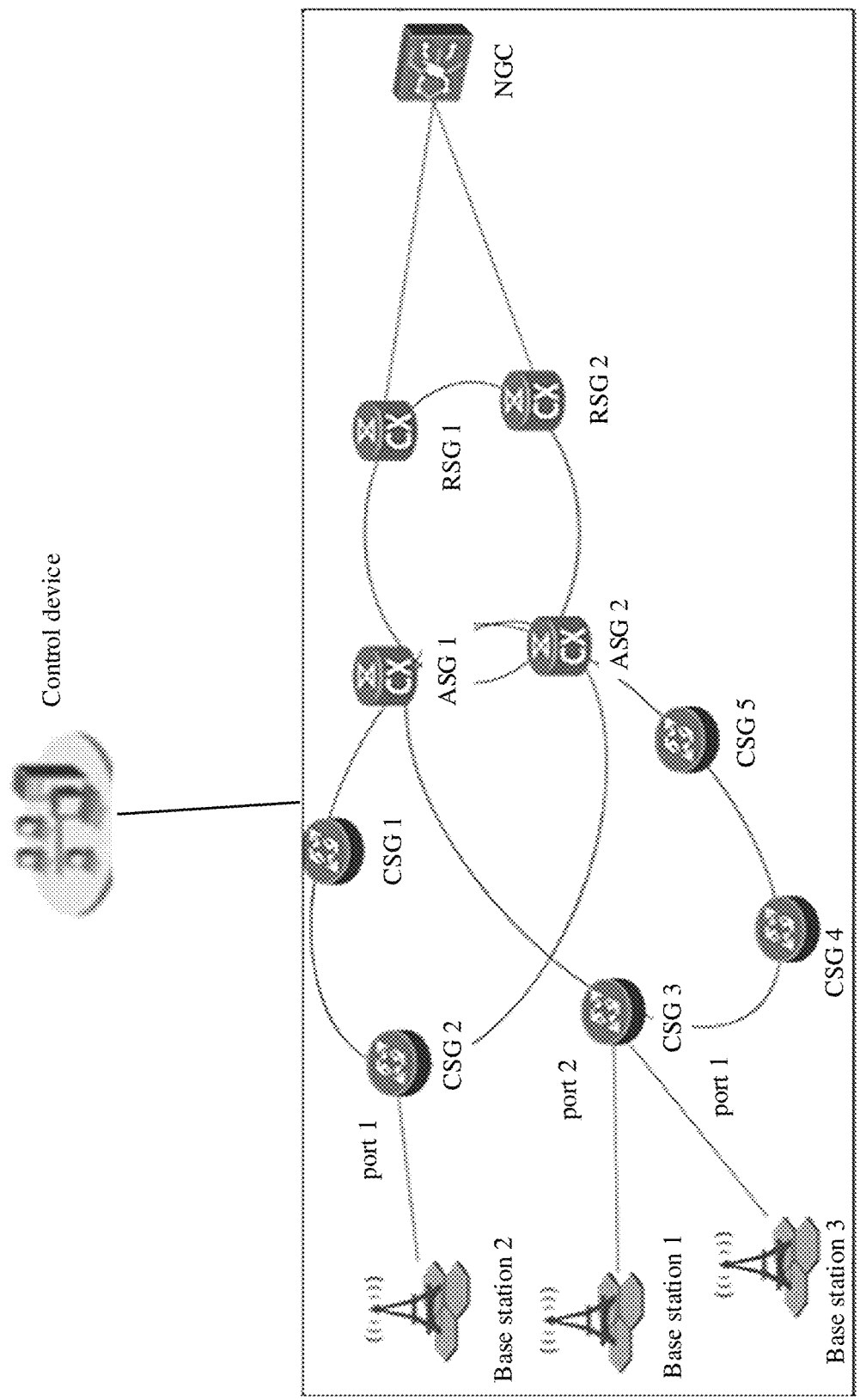
FIG. 1 is a schematic diagram of an example of a network management system according to an embodiment.

In this embodiment, a network management task is executed by a control device. As shown in FIG. 1, the control device manages a network within a range. For example, a control device is configured in a province, and the control device manages a network of the province. During fabric division, the control device obtains a network topology within the managed network range and a pre-planned network hierarchical structure. The control device determines at least one fabric plane for the network topology. Different fabric planes are associated with different network resources and forwarding resources in the different fabric planes are isolated. Even if another resource that is not divided into the fabric plane exists in the network, the fabric plane is also isolated from the resource that is not divided into the fabric plane. In this fabric plane division manner, there is no intersection between fabric planes, so that one network can be effectively used for a plurality of purposes.

A fabric plane is a set of network elements and links and a network configuration resource pool bound to the set. Network elements and links on a fabric plane form a connection diagram. A network topology can be divided into one or more fabric planes. Each fabric plane can define different device ranges and interface resources.

For each fabric plane, the control device may determine at least one type of fabric area (fabric area) based on the pre-planned network hierarchical structure.

On a fabric plane, a group of network elements and links that provide an abstract network capability is called a fabric area. Network elements and links in a fabric area form a connection sub-diagram on a fabric plane to which the network elements and links belong. The fabric area provides an abstract network function, and the abstract network function is an assurance of the fabric area to the forwarding capability of the fabric area. A user of the abstract network function does not need to pay attention to a connection mode and topology within the fabric area.

The following describes a fabric plane and a fabric area with reference to accompanying drawings.

The control device may obtain a network topology formed by network elements and links shown in FIG. 1. The network topology is a network topology of a bearer network. Actually, the network topology in this embodiment is not limited to the network topology of the bearer network, and may also be another type of network topology, for example, a single-layer network topology or a data center network topology.

The control device may divide the network topology shown in FIG. 1 into a plurality of fabric planes that are logically isolated from each other. For example, the control device may divide the network topology shown in FIG. 1 into two different fabric planes: fabric plane M and fabric plane N shown in FIG. 2.

When dividing the fabric planes, the control device may flexibly define a set of network elements included in each fabric plane. For example, the fabric plane N in FIG. 2 includes all network elements in the network topology shown in FIG. 1, but the fabric plane M does not include network elements: a cell site gateway (CSG) 1 and a CSG 2.

Figure 2:
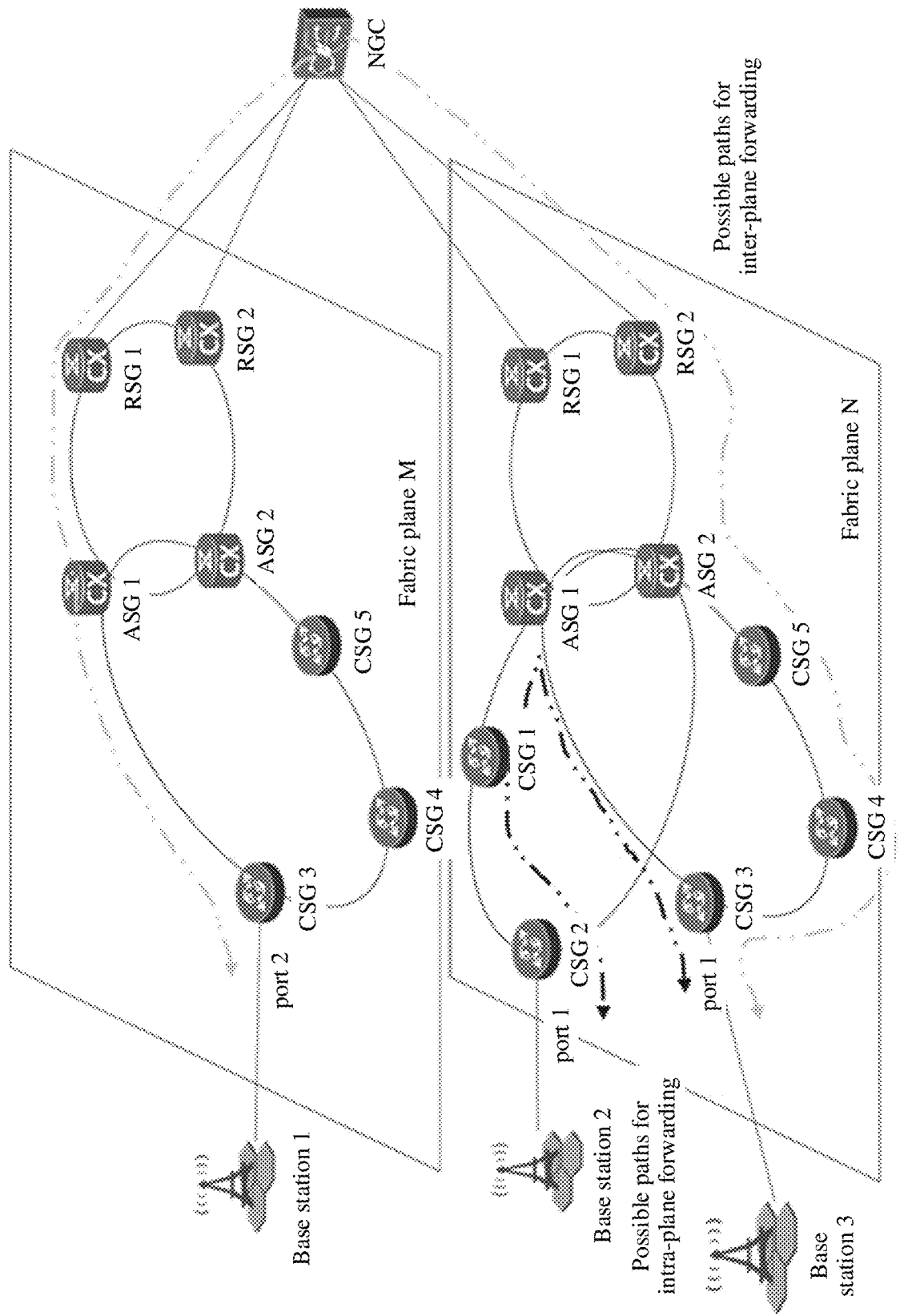
FIG. 2 is a schematic diagram of an example of a fabric plane according to an embodiment.

As shown in FIG. 2, in fabric plane division, the same network elements can belong to different fabric planes. For example, a CSG 4 in FIG. 2 belongs to both the fabric plane M and the fabric plane N.

The two fabric planes of the fabric plane M and the fabric plane N are associated with different network resources and forwarding resources on different fabric planes are isolated.

Base stations connected to the same fabric plane communicate with each other by using forwarding resources on the fabric plane, such as a sub-interface set, a network slice, a link bandwidth, and a virtual private network (VPN) instance.

Two base stations connected to different fabric planes can communicate with each other only through third-party forwarding. As shown in FIG. 2, a base station 1 and a base station 3 need to communicate with each other through forwarding by a new generation core (NGC) network, although both the base station 1 and the base station 3 physically access a network by using a CSG 3.

One fabric plane can carry one or more types of VPN services. In a typical 5G bearer network scenario, similar services are deployed on the same fabric plane as much as possible. In other words, by dividing different fabric planes in a same network, services that are required by different service level agreements (SLA) may use different link forwarding resources and different network bearer technologies. Before determining the fabric plane, the control device further obtains a requirement of a service level agreement SLA of the service and determines at least one fabric plane based on the requirement of the SLA. Requirements of different SLAs correspond to different fabric planes. Determining the fabric plane may not be limited to the requirement of the SLA, and the fabric plane may also be determined based on another requirement or rule.

For each fabric plane, a fabric area may be further planned, and one fabric plane may include at least one fabric area. As shown in a schematic diagram of a fabric area in FIG. 3, a fabric area 0, a fabric area 1, and a fabric area 2 are three different fabric areas.

The control device can flexibly define a set of network elements in each fabric area. For example, the fabric area 1 in FIG. 3 contains seven network elements: an aggregate site gateway (ASG) 1, an ASG 2, a CSG 1, a CSG 2, a CSG 3, a CSG 4, and a CSG 5. Same network elements can belong to a plurality of fabric areas at the same time. For example, the ASG 1 in FIG. 3 belongs to both the fabric area 0 and the fabric area 1. A network topology in each fabric area is a connection sub-diagram, and network elements in each fabric area belong to a same interior gateway protocol (IGP) domain. The connection sub-diagram is relative to a connection diagram of the fabric. A connection diagram means that in a graph G, if there is a path connected from a vertex i to a vertex j, it is considered that i and j are connected. The connection sub-diagram means that if all fixed points and edges of a graph G' belong to the graph G, the graph G' is a sub-diagram of the graph G. The IGP domain refers to an IGP range. Network elements in the same IGP domain can have different IGP process identifiers. The IGP process identifier may be an IGP process number or may be other IGP identifier information.

Figure 3:
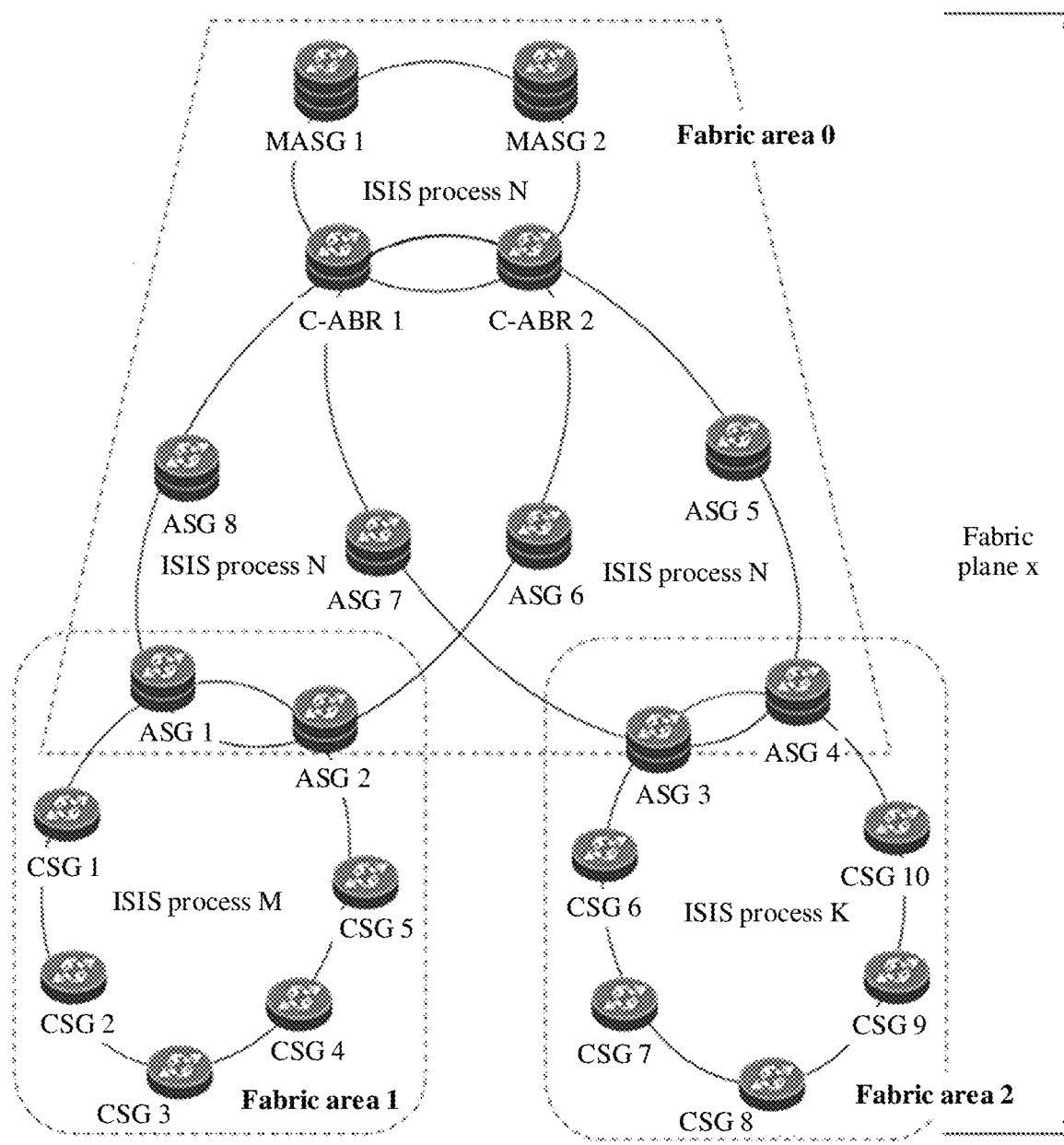
FIG. 3 is a schematic diagram of an example of a fabric area of a bearer network according to an embodiment.
Figure 4:
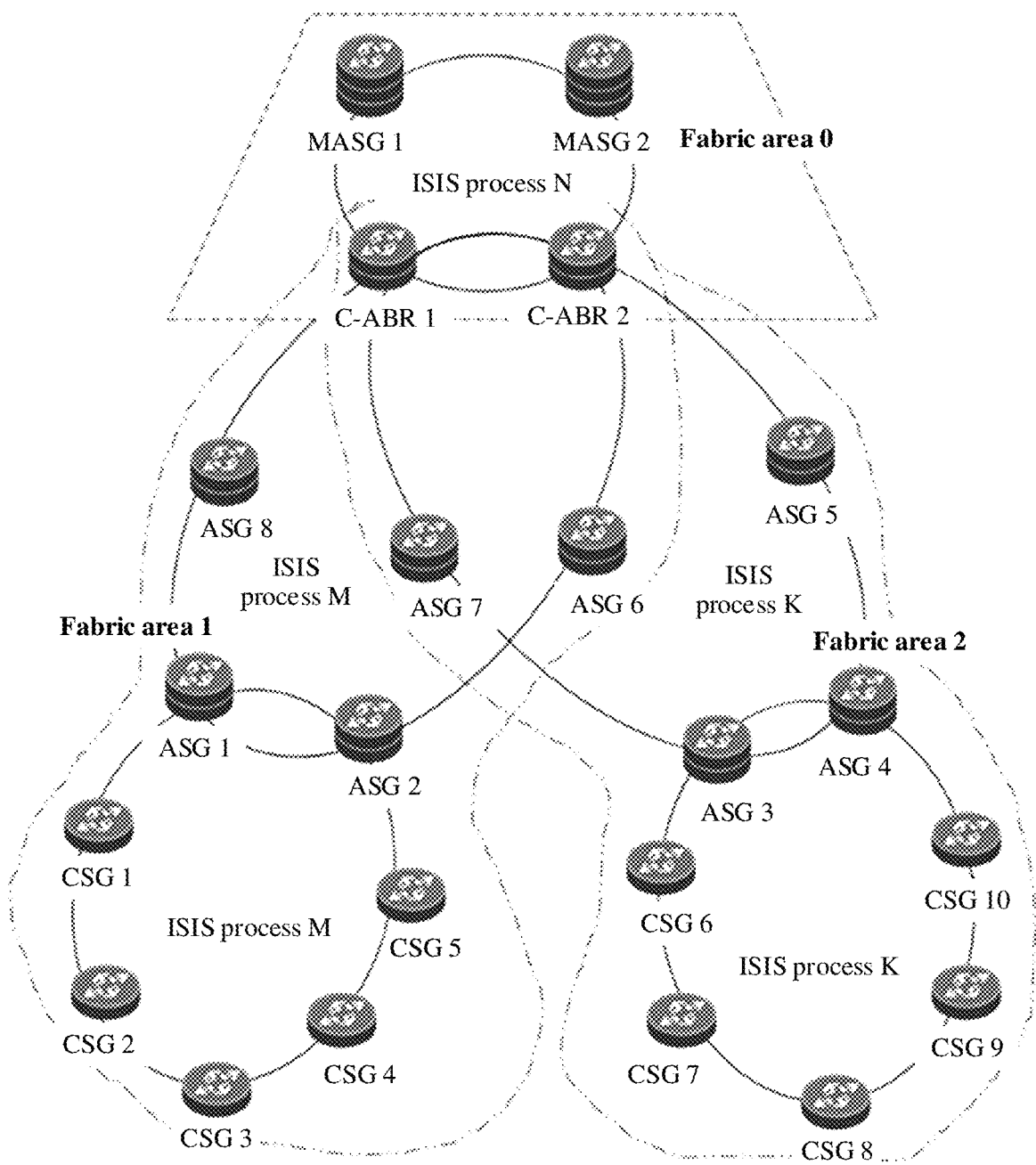
FIG. 4 is a schematic diagram of another example of a fabric area of a bearer network according to an embodiment.

As shown in FIG. 3, the ASG 1, the ASG 2, the CSG 1, the CSG 2, the CSG 3, the CSG 4, and the CSG 5 are in the same IGP domain and are connected to each other. Therefore, the ASG 1, the ASG 2, the CSG 1, the CSG 2, the CSG 3, the CSG 4, and the CSG 5 can be collected in the same fabric area. Similarly, if different IGP domain planning modes are used, the fabric area ranges are different. As shown in FIG. 4, a core-area border router (C-ABR) 1, a C-ABR 2, an ASG 8, an ASG 6, an ASG 1, an ASG 2, a CSG 1, a CSG 2, a CSG 3, a CSG 4, and a CSG 5 are in the same IGP domain and are connected to each other. In this case, the fabric area 1 should contain all the foregoing network elements.

The fabric area assures an abstract network capability externally and uses a same bearer technology internally. For example, if possible, the fabric area 1 assures 300 Mbit/s uplink bandwidths for all services received from CSG network elements. In addition, the CSG network elements in the fabric area 1 can achieve this assurance by using segment routing-traffic engineering (SR-TE) tunnels configured with bandwidth guarantee.

Based on a layer and network topology of the fabric area during forwarding, the control device can divide the fabric area into four types: an access type, an aggregate type, a default type, and a data center (DC) type. Each type of fabric area promises only a corresponding service forwarding capability.

Figure 5:
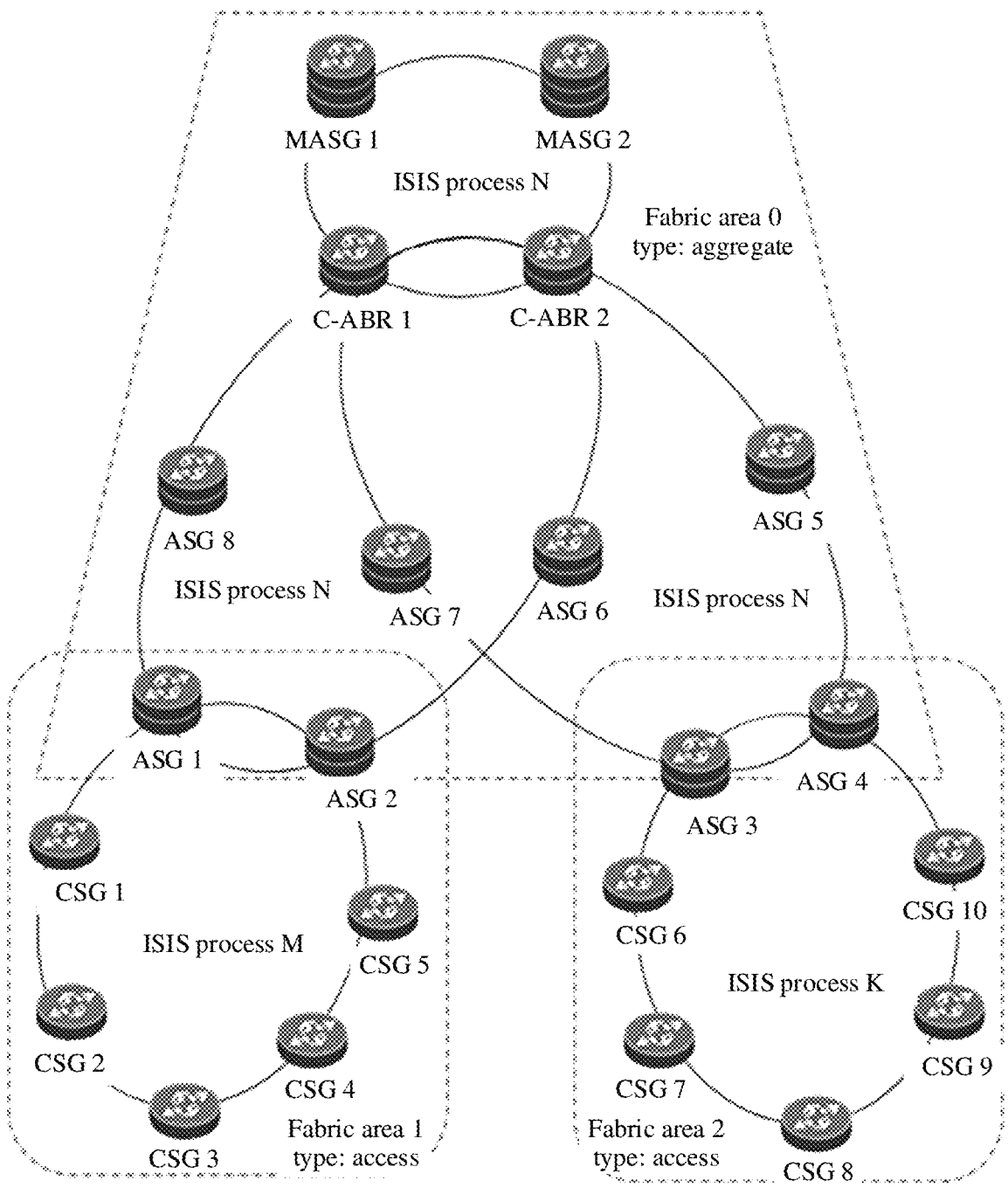
FIG. 5 is a schematic diagram of another example of a fabric area of a bearer network according to an embodiment.

When the network topology is a hierarchical bearer network topology, the type of the fabric area includes an aggregate type and the access type. As shown in FIG. 5, the fabric area 0 is the aggregate-type fabric area, and the fabric area 1 and the fabric area 2 are the access-type fabric areas. Forwarding between the access-type fabric areas needs to pass through the aggregate-type fabric area, and uplink service forwarding of the access-type fabric area needs to pass through the aggregate-type fabric area.

Figure 6:
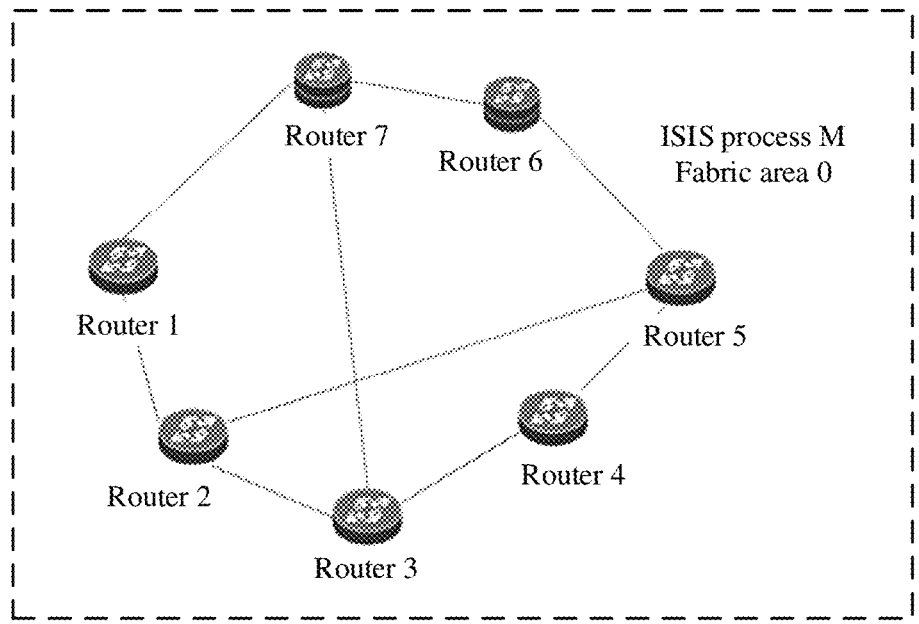
FIG. 6 is a schematic diagram of an example of a default-type fabric area according to an embodiment.

The foregoing shows area types of a hierarchical bearer network. A simple network that is not layered is also called a single-layer network. When the network topology is a single-layer network topology, the type of the fabric area is the default type. As shown in FIG. 6, a fabric plane includes a default-type fabric area. Similarly, a topology of network elements and links in the default-type fabric area is a connection diagram, and all network elements belong to a same IGP domain.

Figure 7:
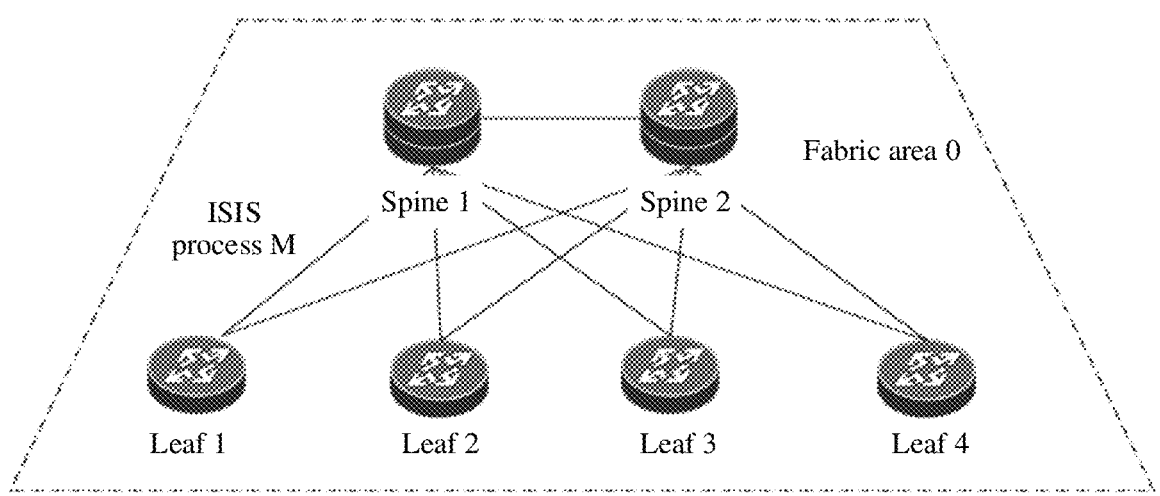
FIG. 7 is a schematic diagram of an example of a data center-type fabric area according to an embodiment.

When the network topology is a data center network topology, the first fabric plane is a data center type. For the data center network topology, as shown in FIG. 7, a fabric plane includes a DC-type fabric area. Similarly, a topology of network elements and links in the DC-type fabric area is a connection diagram, and all network elements belong to a same IGP domain. In particular, the topology of the DC-type fabric area should also comply with a spine-leaf structure.

Figure 8:
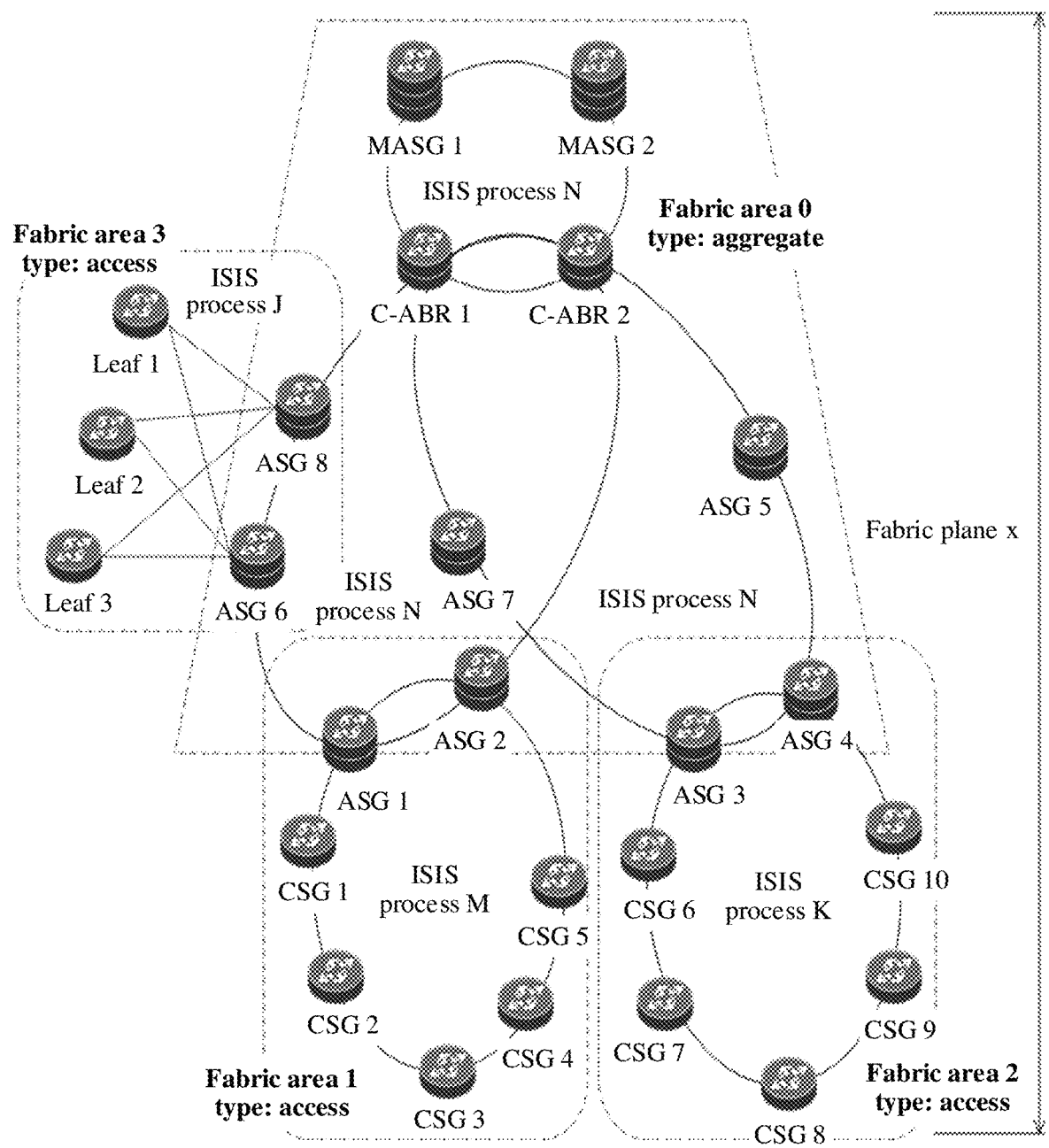
FIG. 8 is a schematic diagram of an example of a cloud-network synergy fabric area according to an embodiment.

It should be noted that different types of fabric areas can be combined. When the network topology is a cloud-network synergy network topology, the type of the fabric area includes an aggregate type, an access type, and a data center type, and the cloud-network synergy network topology is a combination of a hierarchical bearer network topology and the data center network topology. As shown in FIG. 8, a 5G bearer network is a combination of an access-type fabric area and an aggregate-type fabric area. In this case, if an edge DC needs to be co-managed, there may be a scenario in which three types of fabric areas are cascaded.

For network elements in the fabric areas, if different network elements play different functions in a forwarding process, network element roles need to be differentiated. There are three types of network element roles: an access role, a border role, and a deliver role.

The access role: In a forwarding process, when a network element receives traffic outside a local fabric area and forwards the traffic to a border network element in the local fabric area, the network element is an access network element in the fabric area. Typically, in an access-type fabric area, a CSG network element is usually the access network element.

The border role: In a forwarding process, when a network element receives traffic from a local fabric area and forwards the traffic to another fabric area, the network element is a border network element in the local fabric area. Typically, in an access-type fabric area, an ASG network element is usually the border network element.

A default-type fabric area: All network elements in the area are access network elements.

The access-type fabric area: The area contains one or more access network elements, two egress network elements that function as border network elements, and zero to a plurality of transparent transmission network elements. The border network elements need to be identified as an active network element and a standby network element.

An aggregation-type fabric area: The area contains one or more access network elements, two egress network elements that function as border network elements, and zero to a plurality of transparent transmission network elements. The border network elements need to be identified as an active network element and a standby network element.

A DC-type fabric area: This area contains one or more access network elements. The two egress nodes are border network elements and need to be identified as an active node and a standby node. In the DC-type fabric area, leaf network elements are usually used as access network elements, and spine/gateway (GW) network elements are usually used as border network elements.

A forwarding capability of the border network element is higher than that of the access network element. When a network element belongs to a plurality of fabric areas, the network element may have the same or different roles in different fabric areas.

The foregoing describes four types of fabric areas, and the following describes a process of determining the four types of fabric areas.

For the fabric plane of the bearer network, that the control device determines at least one type of fabric area based on the pre-planned network hierarchical structure may include two parts: determining the aggregation-type fabric area and determining the access-type fabric area.

A process in which the control device determines the aggregation-type fabric area may include:

The control device obtains first intent information corresponding to a first fabric plane, where the first intent information includes information about a pair of core aggregation network elements on the first fabric plane and a first interior gateway protocol IGP process identifier of the pair of core aggregation network elements, and the first fabric plane is any one of the at least one fabric plane;

the control device searches, based on the information about the pair of core aggregation network elements, the first fabric plane for a network element and a link that are in the same IGP domain as the first IGP process identifier starting from the pair of core aggregation network elements, so as to determine the aggregation-type fabric area, where a topology view of the aggregation-type fabric area is a connection sub-diagram in a connection diagram of the first fabric plane; and the control device determines at least one access-type fabric area based on the aggregation-type fabric area.

In this possible implementation, the intent information is used to indicate an intent of a network administrator or a user to divide the fabric area. The information about the pair of core aggregation network elements may be information about a mobile aggregation service gateway (MASG) 1 and MASG 2 in FIG. 3 or FIG. 4, for example, information such as device identifiers or internet protocol (IP) addresses of the MASG 1 and MASG 2. An IGP process identifier of the MASG 1 can be the same as or different from that of the MASG 2. However, the IGP process identifiers of the MASG 1 and the MASG 2 belong to a same IGP domain. The IGP domain indicates a range.

A process of based on the information about the pair of core aggregation network elements, the first fabric plane for a network element and a link that are in the same IGP domain as the first IGP process identifier starting from the pair of core aggregation network elements, so as to determine the aggregation-type fabric area.

FIG. 3 is used as an example. It may be understood that, starting from the MASG 1 and the MASG 2, network elements that are of an intermediate system to an intermediate system (ISIS) process N that are located in the same IGP domain as the process identifiers of the MASG 1 and the MASG 2 include a C-ABR 1, a C-ABR 2, an ASG 8, an ASG 1, an ASG 2, an ASG 6, an ASG 7, an ASG 3, an ASG 4, and an ASG 5.

FIG. 4 is used as an example. It may be understood that, starting from the MASG 1 and the MASG 2, network elements that are of an ISIS process N that are located in the same IGP domain as the process identifiers of the MASG 1 and the MASG 2 include a C-ABR 1 and a C-ABR 2.

After determining the aggregation-type fabric area, the control device may determine the at least one access-type fabric area based on the aggregation-type fabric area by using two solutions.

Solution 1:

The control device determines a role of each network element in the aggregation-type fabric area.

The control device subtracts a link in the aggregation-type fabric area from the first fabric plane, to obtain at least one sub-diagram that is not connected to each other.

For each disconnection sub-diagram, the control device searches for a network element and a link that are in the same IGP domain as a second IGP process identifier starting from a first network element in the aggregation-type fabric area, so as to obtain the at least one access-type fabric area, where the first network element and the link, and the network element and the link that are in the same IGP domain as the second IGP process identifier form a connection sub-diagram, access-type fabric areas formed by different disconnection sub-diagrams have different IGP domains, and the first network element is any access network element whose quantity of connecting sides is greater than 2.

Figure 9:
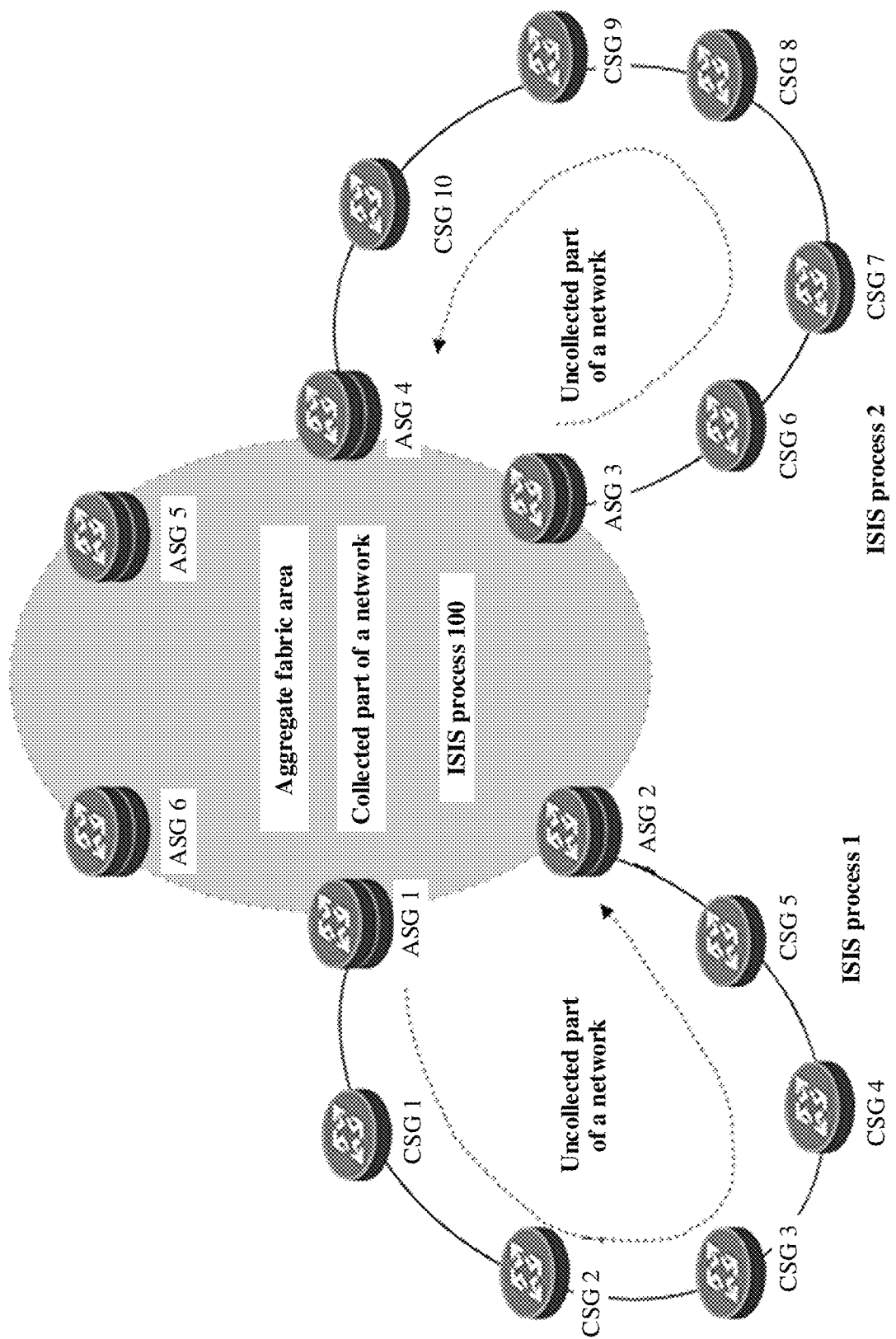
FIG. 9 is a schematic diagram of an example of determining an access-type fabric area according to an embodiment.

In the solution 1, FIG. 9 is used as an example. A collected part of a network is the determined aggregation-type fabric area, and identification information of the IGP domain of the aggregation-type fabric area is an ISIS process 100. The aggregation-type fabric area shown in FIG. 9 includes six network elements: an ASG 1, an ASG 2, an ASG 3, an ASG 4, an ASG 5, and an ASG 6. Among the six network elements, the ASG 1, the ASG 2, the ASG 3, and the ASG 4 are access network elements, and the ASG 5 and the ASG 6 are border network elements. In the aggregation-type fabric area, only access network elements can be added to the access-type fabric area.

The link of the aggregation-type fabric area is subtracted from the topology of the fabric plane shown in FIG. 9. For an uncollected part, two mutually disconnected sub-diagrams are obtained. The two sub-diagrams are the uncollected part of the network, that is, the to-be-determined access-type fabric area. A link between the ASG 1 and the ASG 2 is subtracted. As a result, a first sub-diagram in the two sub-diagrams cannot be connected. A link between the ASG 3 and the ASG 4 is subtracted. As a result, a second sub-diagram cannot be connected. Therefore, when the access-type fabric area is determined, a network element whose edge is greater than 2 is selected from the network elements in the aggregation-type fabric area. In the aggregation-type fabric area shown in FIG. 9, link subtraction is ignored. The ASG 1, the ASG 2, the ASG 3, and the ASG 4 have three connected edges. In other words, all quantities of connected edges are greater than 2. Therefore, for the first disconnection sub-diagram, the ASG 1 or the ASG 2 can be searched for network elements that are in a same IGP domain as a process identifier of the ASG 1 or the ASG 2, and a CSG 1, a CSG 2, a CSG 3, a CSG 4, and a CSG 5 are found, respectively. In this way, an access-type fabric area whose identifier in an IGP domain is the ISIS process 1 is determined based on the link between the ASG 1 and the ASG 2. For the second disconnection sub-diagram, the ASG 3 or ASG 4 can be searched for network elements that are in a same IGP domain as a process identifier of the ASG 3 or ASG 4. A CSG 6, a CSG 7, a CSG 8, a CSG 9, and a CSG 10 are found, respectively. In this way, an access-type fabric area whose identifier in an IGP domain is the ISIS process 2 is determined based on the link between the ASG 3 and the ASG 4.

Through automatic calculation, the control device obtains the following information after network collection:

| Area name | Topo-logy | Area type | Network element | Border network element | IGP ID |
|---|---|---|---|---|---|
| Fabric_agg1 | RING | Aggregate | ASG 1/ASG 2/ASG 3/ ASG 4/ASG 5/ASG 6 | ASG 5/ ASG 6 | 100 |
| Fabric_acc1 | RING | Access | ASG 1/ASG 2/CSG 1/ CSG 2/CSG 3/CSG 4/ CSG 5 | ASG 1/ ASG 2 | 1 |
| Fabric_acc2 | RING | Access | ASG 3/ASG 4/CSG 6/ CSG 7/CSG 8/CSG 9/ CSG 10 | ASG 3/ ASG 4 | 2 |

Solution 2:

The control device determines a role of each network element in the aggregation-type fabric area.

The control device obtains second intent information of the aggregation-type fabric area, where the second intent information includes information about at least one pair of access network elements in the aggregation-type fabric area and an IGP process identifier corresponding to each pair of access network elements.

The control device searches, based on information about a first pair of access network elements, for a network element and a link that are in the same IGP domain as a third IGP process identifier corresponding to the first pair of access network elements starting from the first pair of access network elements on the first fabric plane, so as to determine the access-type fabric area corresponding to the third IGP process identifier, where the first pair of access network elements are any pair of the at least one pair of access network elements, and each pair of access network elements correspond to a different IGP process identifier.

A difference between the solution 2 and the solution 1 is that a link subtraction manner is not used, but the access-type fabric area is determined based on intent information specified by a network administrator or a user. The intent information includes information about at least one pair of access network elements. As shown in FIG. 9, if the second intent information includes information about the ASG 1 and the ASG 2, and IGP process identifiers of the ASG 1 and the ASG 2, the control device may search, starting from the ASG 1 and the ASG 2, for network elements that are in a same IGP domain as the IGP process identifiers of the ASG 1 and the ASG 2, and determine that the CSG 1, the CSG 2, the CSG 3, the CSG 4, and the CSG 5 are in the same IGP domain (the ISIS process 1) as the ASG 1 and the ASG 2, so as to determine the access-type fabric area. In addition, if the second intent information includes information about the ASG 3 and the ASG 4, and IGP process identifiers of the ASG 3 and the ASG 4, the control device may search, starting from the ASG 3 and the ASG 4, for network elements that are in a same IGP domain as the IGP process identifiers of the ASG 3 and the ASG 4, and determine that the CSG 6, the CSG 7, the CSG 8, the CSG 9, and the CSG 10 are in the same IGP domain (the ISIS process 2) as the ASG 3 and the ASG 4, so as to determine another access-type fabric area.

In the second solution, when a user specifies a pair of ASG devices and a pair of downlink interfaces, the user may also specify a name and an IGP process ID of this access-type fabric area.

Figure 10:
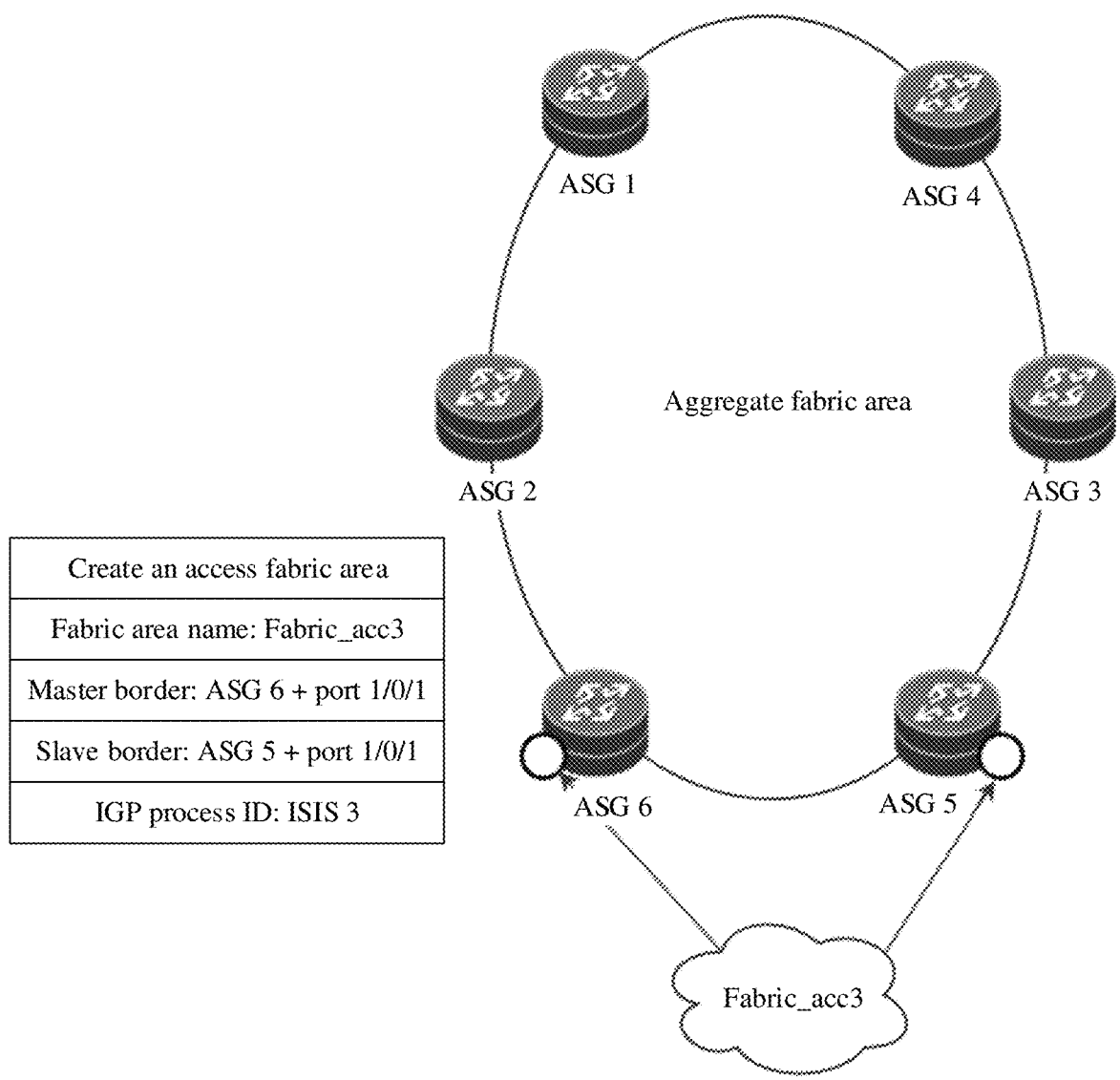
FIG. 10 is a schematic diagram of another example of determining an access-type fabric area according to an embodiment.

As shown in FIG. 10, the second intent information includes that a name of a to-be-created access-type fabric area is Fabric_acc3. An ASG 5 and an ASG 6 are specified as a pair of devices. The ASG 6 is specified as an active border device, and the ASG 5 is specified as a standby border device. Both downstream interface identifiers of the ASG 5 and the ASG 6 are port 1/0/1. An IGP process ID is specified as ISIS 3.

A process of determining a default-type fabric area may be as follows.

The control device obtains third intent information corresponding to a second fabric plane, where the third intent information includes information about a pair of devices and a fourth IGP process identifier of the pair of devices, and the second fabric plane is any one of the at least one fabric plane.

The control device searches, starting from the pair of devices on the second fabric plane based on the information about the pair of devices, for a device and a link that are in a same IGP domain as the fourth IGP process identifier, so as to determine the default-type fabric area. A sparse connection diagram of the default-type fabric area is a subset of a network topology within the managed network range.

For determining the default-type fabric area, refer to FIG. 6 for understanding. In FIG. 6, the third intent information may include information about an RSG 1 and an RSG 2. Then, other network elements that belong to a same IGP domain as an IGP process identifier (ISIS process M) of the RSG 1 and the RSG 2 are searched for. It is determined that IGP process identifiers of the ASG 1, the ASG 2, the CSG 1, the CSG 2, and the CSG 3 belong to a same IGP domain as the IGP process identifiers of RSG 1 and RSG 2. In this case, a default-type fabric area 0 is determined.

A process of determining a DC-type fabric area may be as follows:

The control device obtains fourth intent information corresponding to a third fabric plane, where the fourth intent information includes information about a spine network element, information about a leaf network element, and information about a data center gateway.

The control device determines a link between the spine network element and the leaf network element based on the information about the spine network element and the information about the leaf network element and determines a link between the spine network element and the data center gateway based on the information about the spine network element and the information about the data center gateway, to determine the data center-type fabric area.

For understanding of determining of the DC-type fabric area, refer to FIG. 7. In FIG. 7, the fourth intent information includes information about a spine network element and information about a leaf network element. FIG. 7 does not show the data center gateway. Actually, the DC-type fabric area further includes the data center gateway. After the link between the data center gateway and the spine network element or the link between the spine network element and the leaf network element is determined, the DC-type fabric area is determined. The spine network element, leaf network element, and data center gateway in the DC-type fabric area also belong to the same IGP domain. An IGP domain identifier of the fabric area 0 shown in FIG. 7 is an ISIS process M.

A process of determining a fabric area in a cloud-network synergy scenario can be understood based on the foregoing process of determining the fabric area on the bearer network and data center network.

The foregoing embodiments describe the fabric plane and the fabric area. The following describes a network management method implemented based on the fabric plane.

Figure 11:
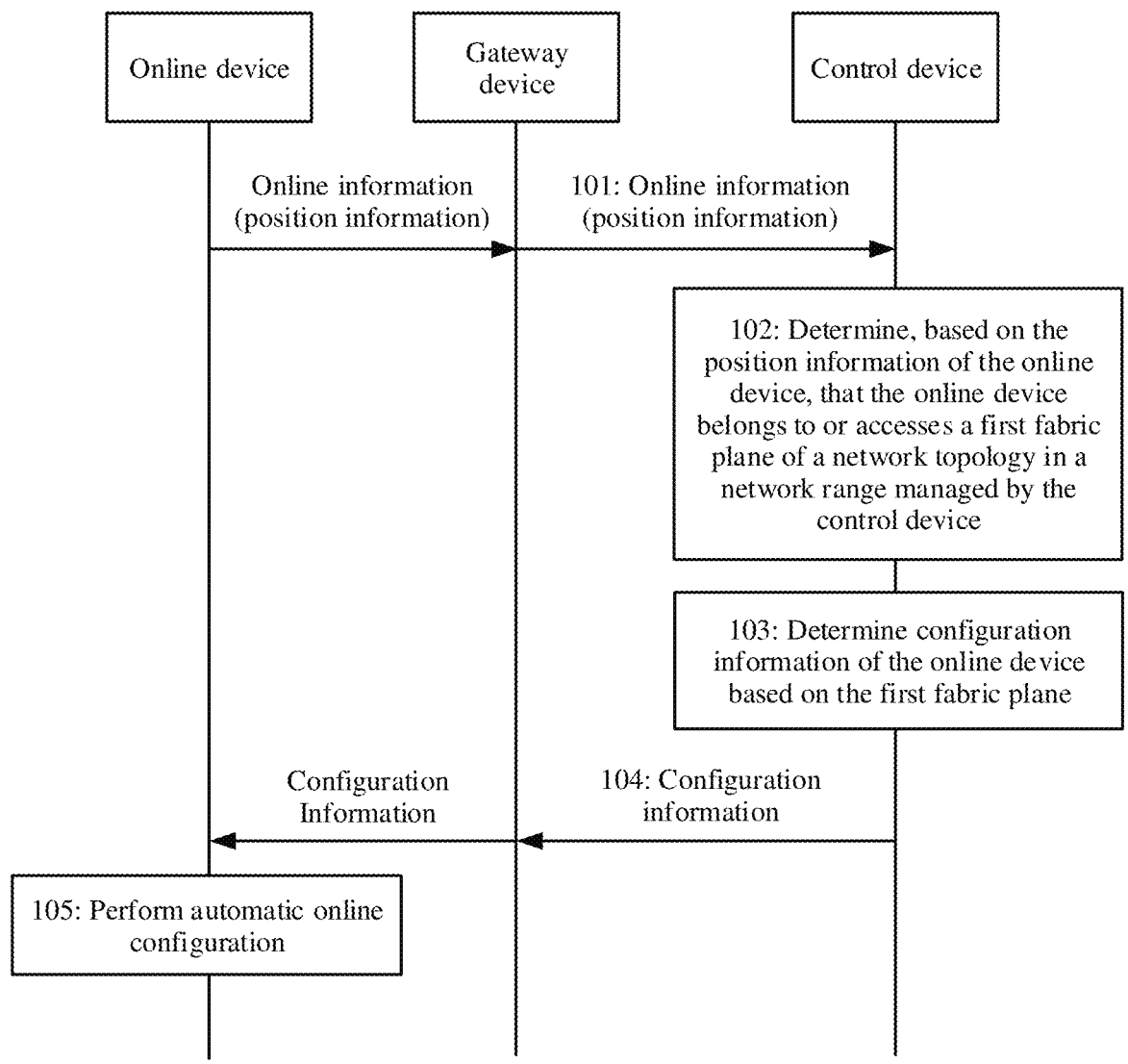
FIG. 11 is a schematic diagram of an embodiment of network management according to an embodiment.

As shown in FIG. 11, an embodiment of a network management method provided in the embodiments may include the following steps.

101: A control device receives information indicating that a device goes online.

The information indicating that a device goes online may be reported to the control device by a gateway device connected to an online device.

The information indicating that a device goes online includes position information of the online device.

102: The control device determines, based on the position information of the online device, that the online device belongs to or accesses a first fabric plane of a network topology within a network range managed by the control device.

The network topology is planned as at least one fabric plane, where a forwarding resource associated with the first fabric plane is isolated from a forwarding resource outside the first fabric plane.

The position information of the online device may be interface information of a device into which the online device is inserted. For example, if a CSG 2 is inserted into a first interface of a CSG 1, the position information may be information of the first interface of the CSG 1. The control device may determine, based on the interface information of the gateway device into which the online device is inserted, a fabric plane to which the online device belongs.

When the online device belongs to the first fabric plane of the network topology within the network range managed by the control device, the online device may be a gateway device in an access-type fabric area. The online device may alternatively be a gateway device in a default-type fabric area.

That the online device accesses the first fabric plane of the network topology within the network range managed by the control device indicates that the online device does not belong to the first fabric plane but may be connected to a device on the first fabric plane for communication. The online device may be a base station when accessing a bearer network or may be a virtual machine (VM) when accessing a DC network.

103: The control device determines configuration information of the online device based on the first fabric plane.

As described above, each fabric plane manages one resource pool, and the control device may allocate a resource to the online device based on a resource pool managed by the fabric plane, to generate corresponding configuration information.

104: The control device sends the configuration information to the online device, where the configuration information is used by the online device to perform automatic online configuration.

The control device may deliver the configuration information by using the gateway device connected to the online device.

105: After receiving the configuration information, the online device performs automatic online configuration.

According to the solution provided in this embodiment, the control device may perform automatic management on the online device based on the fabric plane. After the device goes online, the control device may determine the configuration information for the online device, where the configuration information is used for automatic online configuration of the online device. In this way, automatic online management of the device is implemented, and network management efficiency is improved.

The foregoing embodiment corresponding to FIG. 11 is described as a whole, and the following separately describes the embodiment.

1. An automatic online process and an automatic offline process of an access device that belongs to the access-type fabric area of the bearer network.

2. An automatic online process of a base station accessing the bearer network and an automatic online process of a VPN service based on the base station.

3. An automatic online process and an automatic offline process of an access device that belongs to the default-type fabric area.

4. An automatic online process of the VM accessing the DC network, an automatic online process of a VM-based service, and a VM migration process.

The following describes the foregoing processes in sequence.

1. The automatic online process and the automatic offline process of the access device that belongs to the access-type fabric area of the bearer network.

Figure 12:
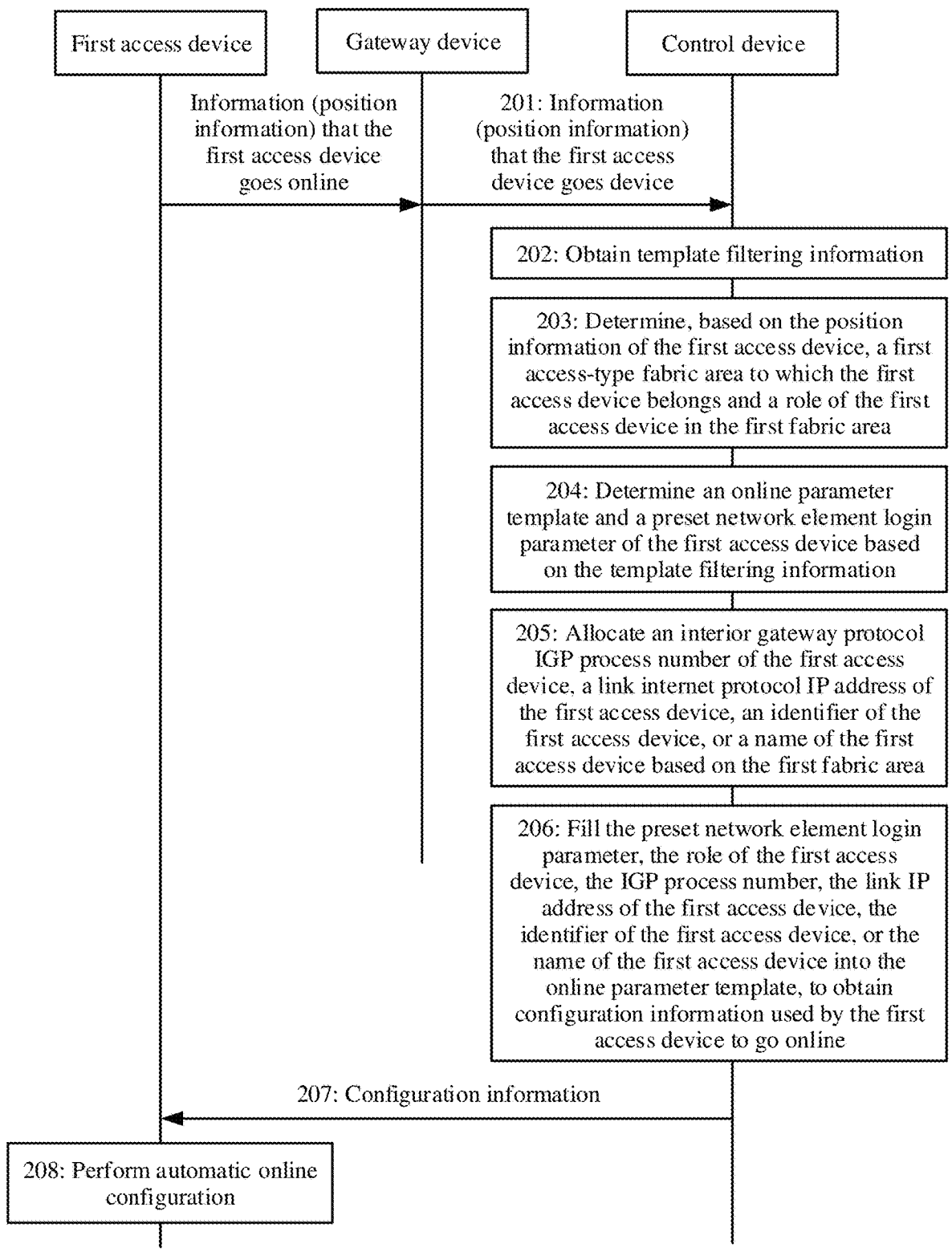
FIG. 12 is a schematic diagram of another embodiment of a network management according to an embodiment.

As shown in FIG. 12, a solution in which a first access device belonging to a bearer network goes online may include the following steps.

201: A control device receives information indicating that a first access device goes online.

The online information may include position information of the first access device, and the position information may be information of an interface of a gateway device accessed by the first access device, for example, an interface identifier.

202: The control device obtains template filtering information.

The template filtering information may be pre-configured during network planning, and the template filtering information may be public network information or private network information. The public network and private network respectively correspond to an online parameter template. The template filtering information may not be limited to the public network information or the private network information and may also have other information. However, no matter what content the template filtering information includes, there is a corresponding online parameter template.

203: The control device determines, based on the position information of the first access device, a first access-type fabric area to which the first access device belongs and a role of the first access device in the first fabric area.

The control device may determine, based on the interface accessed by the first access device, the fabric area that is on the first fabric plane and to which the interface resource belongs. The online devices are usually access network elements.

204: The control device determines an online parameter template of the first access device and a preset network element login parameter based on the template filtering information.

If the template filtering information is the public network information, an online parameter template corresponding to the public network information is determined. If the template filtering information is the private network information, an online parameter template corresponding to the private network information is determined.

The preset network element login parameter may be a username, a password, and the like.

205: The control device allocates an IGP process number of the first access device, a link internet protocol IP address of the first access device, an identifier of the first access device, or a name of the first access device based on the first fabric area, where all devices included in the first fabric area belong to a same IGP domain.

A fabric plane corresponds to a resource pool. The resource pool contains resources that can be used by online network elements on the plane, such as address resources, name resources, and IGP process resources. The identifier of the first access device may be the IP address of the first access device. Because each fabric area has a different IGP domain, the control device allocates a resource based on a fabric area to which the first access device belongs.

206: The control device fills the preset network element login parameter, a role of the first access device, the IGP process number, the link IP address of the first access device, the identifier of the first access device, or the name of the first access device into the online parameter template, to obtain configuration information used by the first access device to go online.

The foregoing information backfilling process may be expressed in a form of a field as follows:

```
post://path/to/iplct-service/igp/protocol/c865a444-f211-11e8-8eb2-f2801f1b9fd1
{
    "Network element ne-id": "c865a444-f211-11e8-8eb2-f2801f1b9fd1",
    "Network element homing ne-prefix": "Beijing-Fabric_acc3-01",
    "Network element role ne-role": "CSG",
    "solution-name": "5G-HVPN",
    "sub-solution": "Public network solution",
    "protocols": [
        {
            "igp-type": "ISIS",
            "igp-id": 3,
            "igp-level": 2,
            "cost": 20
        }
    ]
}
```

NE indicates a network entity.

207: The control device sends the configuration information to the first access device.

208: The first access device automatically goes online in the access-type fabric area based on the configuration information.

After the first access device goes online, relationships of network elements and links of the access-type fabric area in which the first access device is located change. In this way, the control device needs to update, based on the relationships of the first access device, a connection sub-diagram of the access-type fabric area accessed by the first access device.

A process of go-online of a device may be as follows:

When a second access device in the first fabric area goes offline, the control device determines changed configuration information of a changed network element, where the changed network element is a network element whose configuration information changes because the second access device goes offline; and the control device sends the changed configuration information to the changed network element, where the changed configuration information is used by the changed network element to perform automatic update configuration.

When a second access device in the access-type fabric area goes offline, the control device obtains a link relationship of the second access device, and the control device deletes the second access device and a link relationship corresponding to the second access device from a first connection sub-diagram corresponding to the access-type fabric area, and re-establishes a link relationship of remaining network elements in the first connection sub-diagram, to obtain a second connection sub-diagram.

Compared with that in the conventional technology in which a device goes online process requires serial manual confirmation in each step, an entire process takes 3 to 10 days, a flow time is uncontrollable, and there are many errors, the solution for automatically going online provided in this embodiment does not require manual intervention, automatic online configuration can be implemented in the entire process, and the solution is simple, convenient, and accurate.

According to the solution in which the access device automatically goes offline provided in this embodiment, after the access device goes offline, changed configuration information of the changed network elements may be automatically updated for the network elements whose configurations are changed, so that the configuration information is automatically updated. In addition, the connection sub-diagram is automatically updated without manual intervention, so that network management efficiency when the device goes offline is improved.

2. The automatic online process of the first base station accessing the bearer network and the automatic online process of the VPN service based on the first base station.

Figure 13:
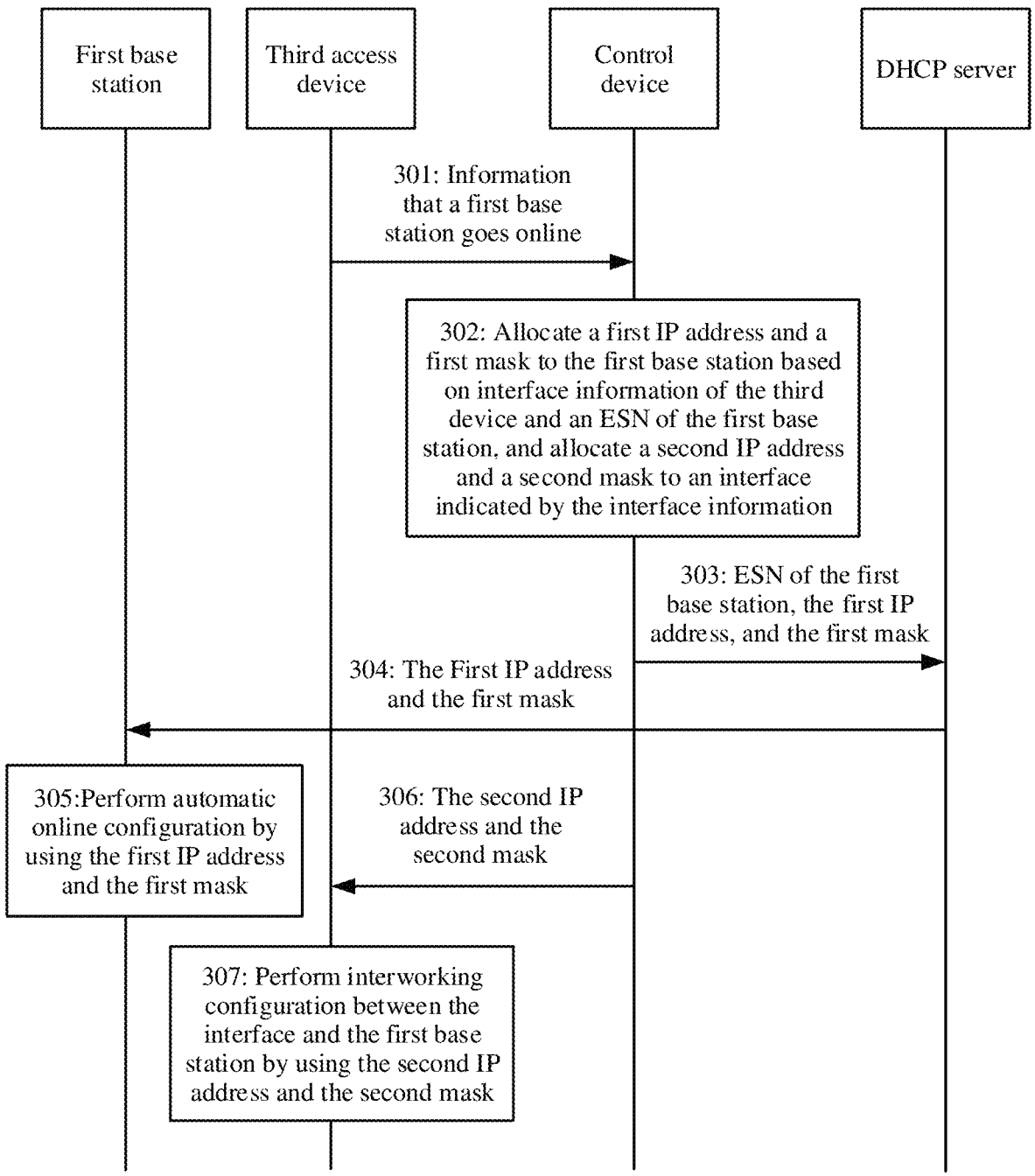
FIG. 13 is a schematic diagram of another embodiment of a network management according to an embodiment.

As shown in FIG. 13, a process in which the first base station goes online may include these steps.

301: After a first base station is inserted into an interface of a third access device, the third access device sends, to a control device, information indicating that a first base station goes online. Correspondingly, the control device obtains the information indicating that a first base station goes online.

The information indicating that a first base station goes online includes interface information of a third access device accessed by the first base station in an access-type fabric area and an electronic serial number (ESN) of the first base station. The interface information of the third access device may be an interface identifier of the third access device.

302: The control device allocates, based on the interface information of the third access device and the ESN of the first base station, a first IP address and a first mask to the first base station, and allocates a second IP address and a second mask to an interface indicated by the interface information.

The first IP address and the second IP address belong to a same network segment. This process may be that the control device determines, based on the interface information of the third access device and the ESN of the first base station, a resource pool associated with a fabric plane to which the third access device belongs, where the resource pool includes an IP address and a mask that can be allocated to a device corresponding to the fabric plane to which the third access device belongs. The control device allocates a first IP address and a first mask to the first base station based on the resource pool and allocates a second IP address and a second mask to an interface indicated by the interface information.

303: The control device sends the ESN, the first IP address, and the first mask of the first base station to a dynamic host configuration protocol (DHCP) server.

304: The DHCP server sends the first IP address and the first mask to the first base station by using the third access device.

305: The first base station performs automatic online configuration by using the first IP address and the first mask.

306: The control device sends the second IP address and the second mask to the third access device.

307: The third access device performs interworking configuration between the interface and the first base station by using the second IP address and the second mask.

Figure 14:
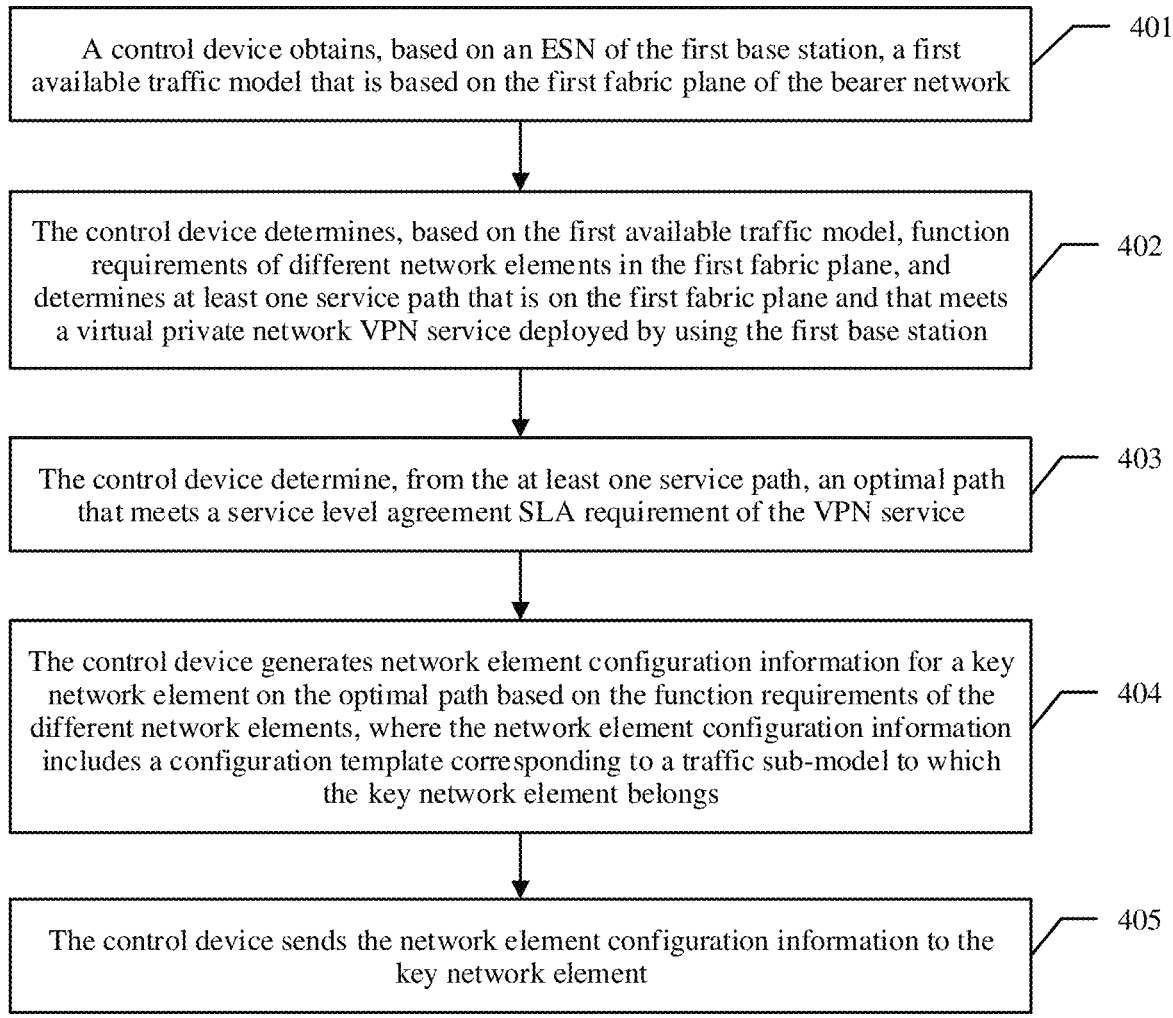
FIG. 14 is a schematic diagram of another embodiment of a network management according to an embodiment.

As shown in FIG. 14, a process of performing service online based on a first base station may include the following steps.

401: A control device obtains, based on an ESN of the first base station, a first available traffic model that is based on the first fabric plane of the bearer network.

The first available traffic model includes a traffic sub-model for communication between a base station and the internet, a network management traffic sub-model, and a traffic sub-model for communication between base stations; In this possible implementation, a traffic sub-model for communication between the first base station and the internet may be referred to as an N2/N3 service traffic model, the network management traffic model may be referred to as an orchestrator management (OM) management traffic sub-model, and a traffic model for communication between the first base station and another base station may be referred to as an Xn service traffic sub-model.

Figure 14A:
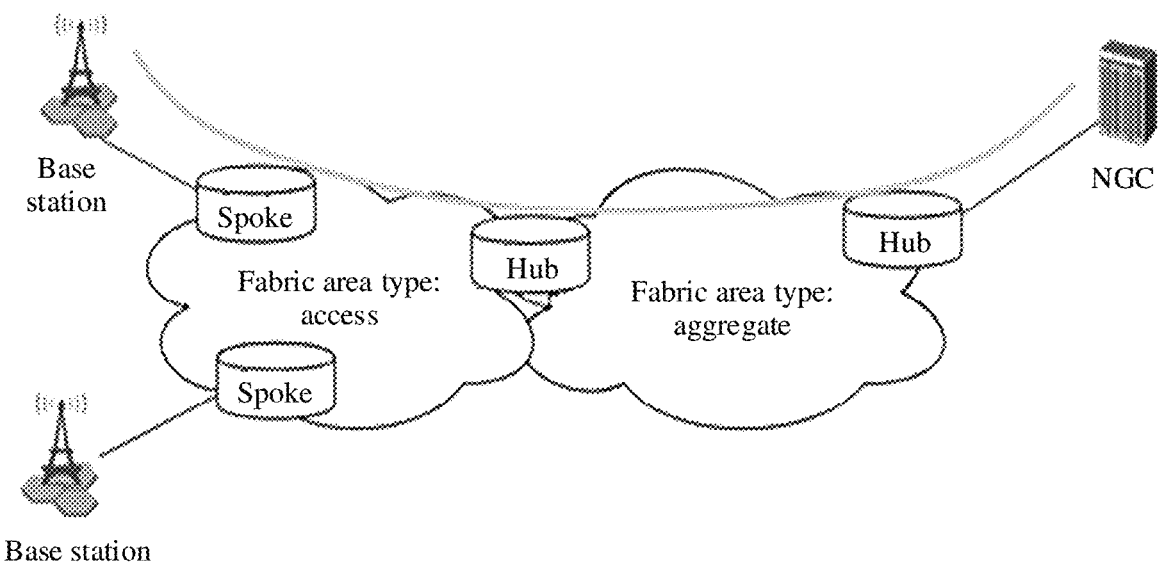
FIG. 14A is a schematic diagram of a traffic sub-model according to an embodiment.

A connection relationship shown in FIG. 14A may correspond to the N2/N3 service traffic sub-model.

In FIG. 14A, there are two types of access point types: a first base station and an NGC. An access point type on the NGC side is Hub, and an access point type on the first base station side is Spoke. The access points are eventually instantiated as one access device or a pair of access devices. In FIG. 14A, there are two types of fabric areas: an access type and an aggregate type. The access-side spoke element of the first base station is in the access-type fabric area, and the NGC access-side hub element is in the aggregate-type fabric area. The hub between the two fabric areas functions as a relay node for cross-layer VPN services. The types of fabric areas are assigned to the access-type fabric area and the aggregate-type fabric area.

Figure 14B:
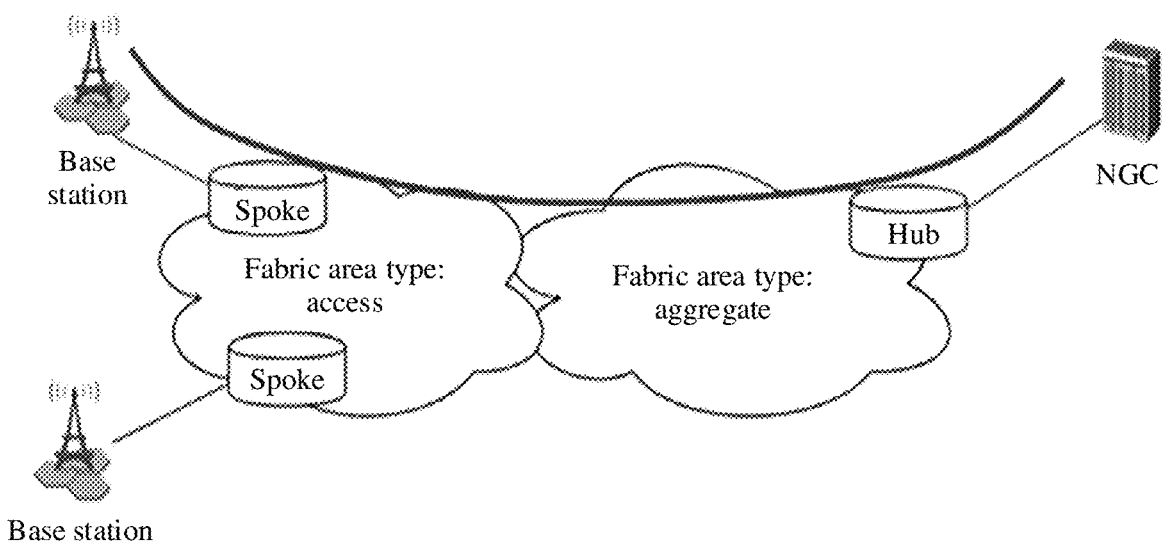
FIG. 14B is a schematic diagram of another traffic sub-model according to an embodiment.
Figure 14C:
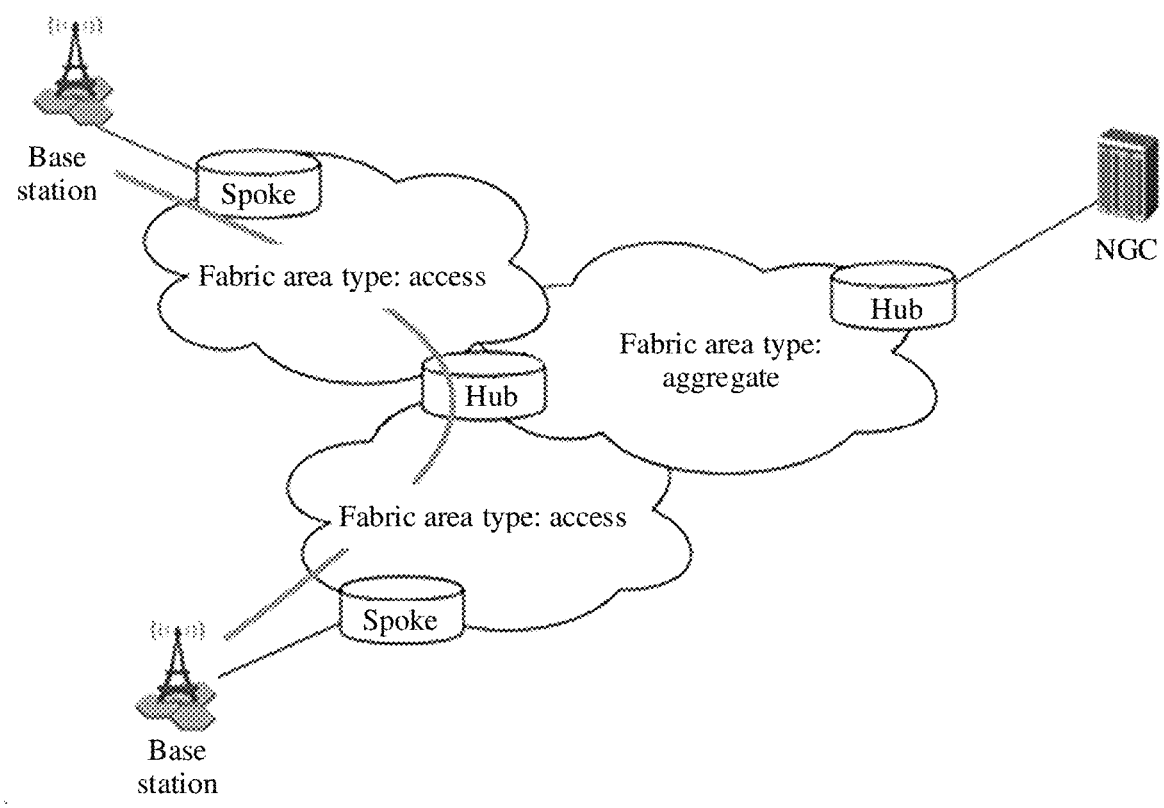
FIG. 14C is a schematic diagram of another traffic sub-model according to an embodiment.

The connection relationship shown in FIG. 14B may correspond to the OM management traffic model, and the connection relationship shown in FIG. 14C may correspond to the Xn service traffic model. Connection relationships expressed in FIG. 14B and FIG. 14C are similar to that in FIG. 14A and may be understood with reference to corresponding descriptions in FIG. 14A.

402: The control device determines, based on the first available traffic model, function requirements of different network elements on the first fabric plane, and determines at least one service path that is on the first fabric plane and that meets a virtual private network VPN service deployed by using the first base station.

Different function requirements correspond to different traffic sub-models, and each traffic sub-model corresponds to one set of configuration templates.

Figure 14D:
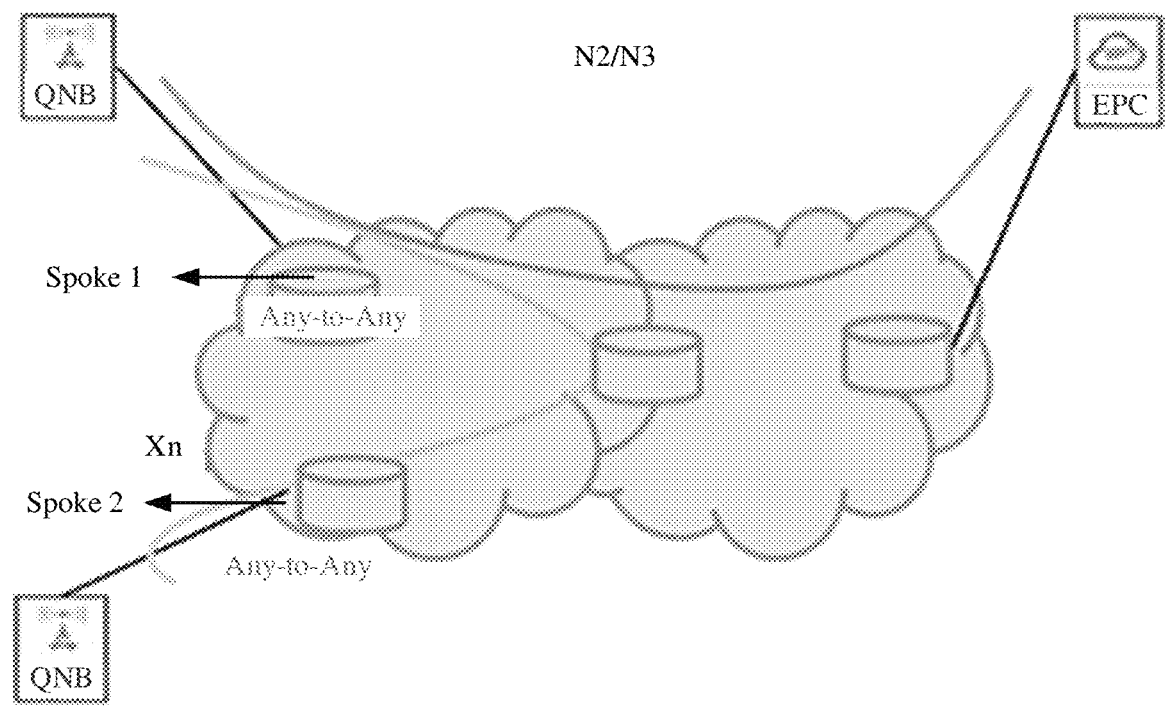
FIG. 14D is a schematic diagram of an available traffic model according to an embodiment.

In a network topology, each network element has a different function requirement. For example, in FIG. 14D, the Spoke 1 undertakes a task of communicating with the internet and undertakes a task of communicating with another first base station, but the Spoke 2 only undertakes a task of communicating with the Spoke 1. In this case, the Spoke 1 needs to configure a configuration template of the traffic model for communication between the first base station and the internet, and a configuration template of the traffic model for communication between the first base stations. The Spoke 2 only needs to configure the configuration template of the traffic model for communication between the first base stations.

Figure 15:
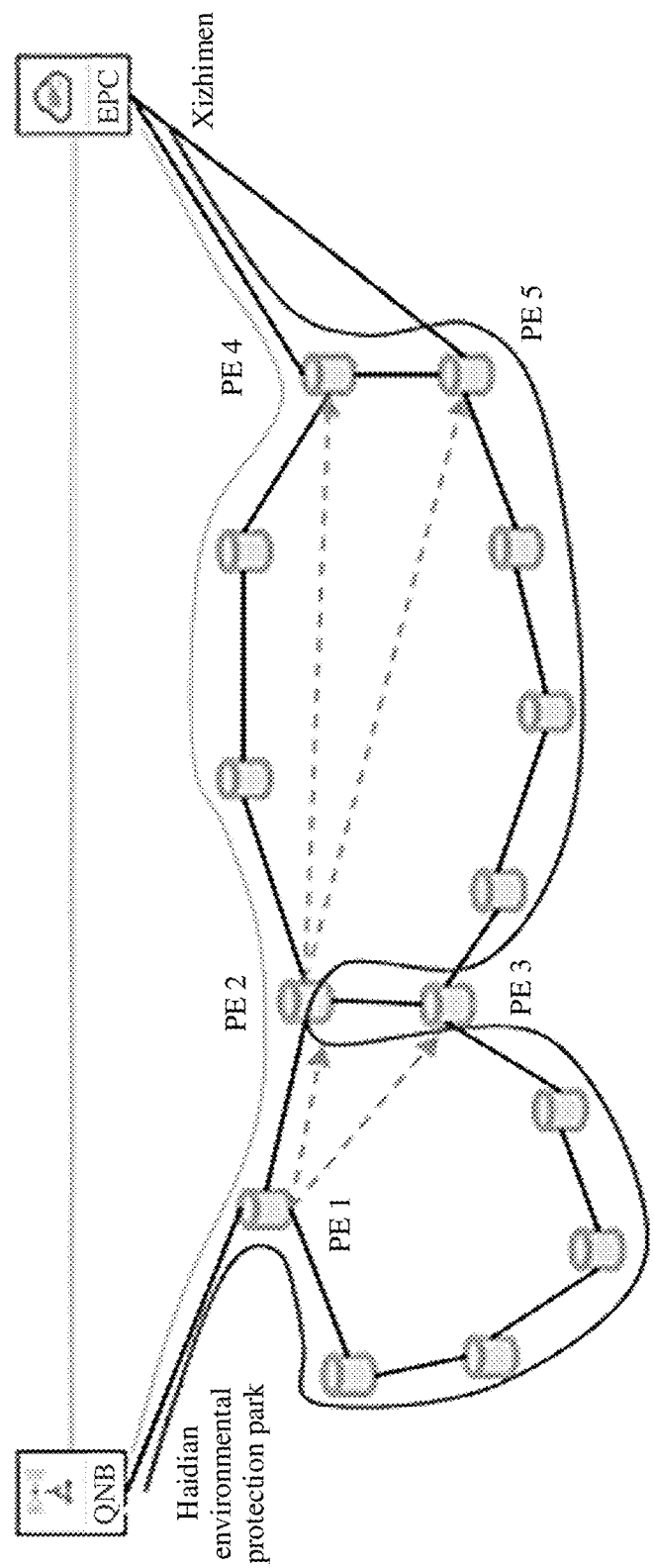
FIG. 15 is a schematic diagram of an example of a path according to an embodiment.

In the network, there may be a plurality of passable paths from a point A to a point B. For example, as shown in FIG. 15, there may be a plurality of paths from Haidian environmental park to Xizhimen.

403: The control device determines, from the at least one service path, an optimal path that meets a service level agreement SLA requirement of the VPN service.

For a plurality of paths, each path may have a different SLA. For example, a path has a high bandwidth and a low delay while a path has a low bandwidth and a long delay. In this way, an optimal path can be selected based on the SLA of each path. For example, in FIG. 15, the paths from Haidian environmental protection park to Xizhimen may include a path 1: Haidian environmental protection park-PE 1-PE 2-PE 4-Xizhimen, and a path 2: Haidian environmental protection park-PE 1-PE 3-PE 5-Xizhimen. If an SLA of the path 1 is higher than that of the path 2, the path 1 may be selected as the optimal path.

404: The control device generates network element configuration information for a key network element on the optimal path based on the function requirements of the different network elements, where the network element configuration information includes a configuration template corresponding to a traffic sub-model to which the key network element belongs.

The Key network elements can be all or some network elements on the optimal path.

In a network topology, each network element has a different function requirement. The Spoke 1 undertakes a task of communicating with the internet and undertakes a task of communicating with another first base station, but the Spoke 2 only undertakes a task of communicating with the Spoke 1. In this case, the Spoke 1 needs to configure a configuration template of the traffic model for communication between the first base station and the internet, and a configuration template of the traffic model for communication between the first base stations. The Spoke 2 only needs to configure the configuration template of the traffic model for communication between the first base stations.

405: The control device sends the network element configuration information to the key network element.

The network element configuration information is used by the key network element to perform automatic configuration.

Compared with a service online solution, in a conventional technology, in which an operation and maintenance engineer converts a service requirement and a network parameter that are in a work order into a service configuration script and delivers a configuration, the automatic service online management solution provided in this embodiment is fast and accurate.

3. The automatic online process and the automatic offline process of the access device that belongs to the default-type fabric area.

For small- and medium-sized networks, a quantity of devices is small and access requirements are relatively simple. Therefore, a multi-layer network may be used during network construction. A channel between devices can be abstracted as a full-mesh structure, and a quantity of connections is proportional to the square of the quantity of devices. The increase in the quantity of devices makes it difficult to manage the channel between the devices. In this embodiment, this single-layer simple network is planned as a default-type fabric area, so that connections in the area can be effectively managed, and automatic management of network changes can be implemented.

Figure 16:
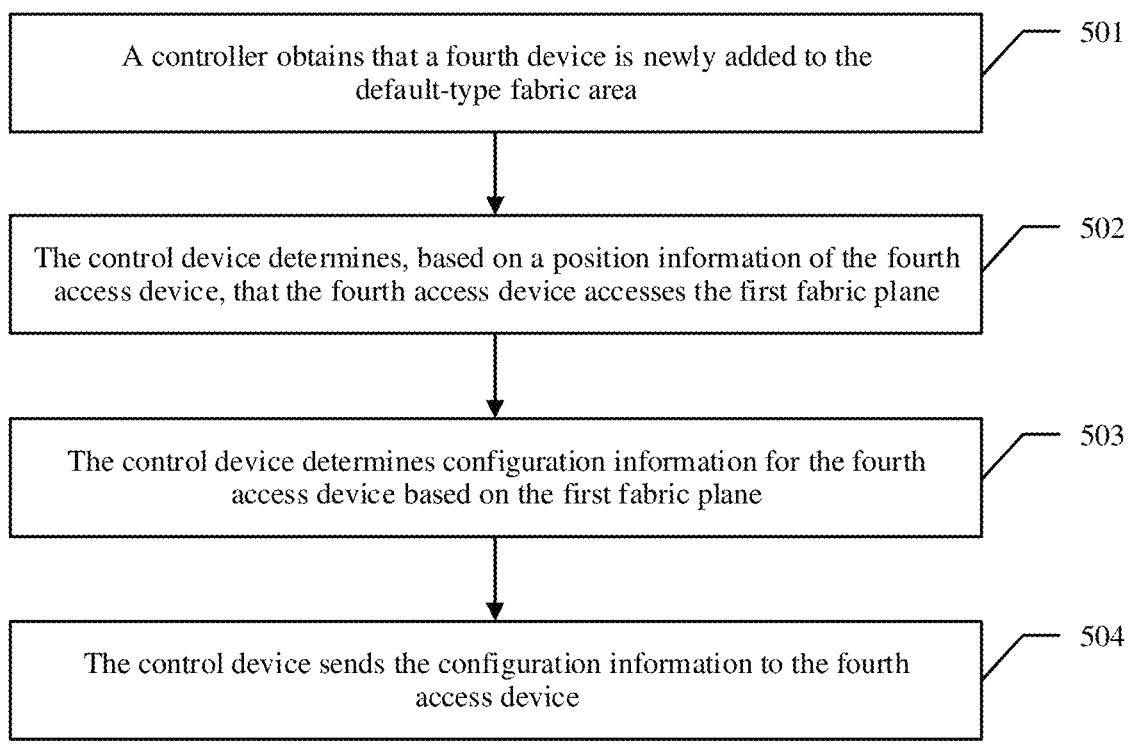
FIG. 16 is a schematic diagram of another embodiment of a network management according to an embodiment.

As shown in FIG. 16, an automatic online and offline process of an access device belonging to a default-type fabric area provided in this embodiment may include the following steps.

501: The control device obtains that a fourth access device is newly added to the default-type fabric area.

502: The control device determines, based on position information of the fourth access device, that the fourth access device accesses a first fabric plane.

503: The control device determines configuration information for the fourth access device based on the first fabric plane.

The configuration information includes an IGP process number of the fourth access device, a link IP address of the fourth access device, an identifier of the fourth access device, or a name of the fourth access device.

The fabric plane to which the fourth access device belongs corresponds to a resource pool, and the control device may allocate the configuration information to the fourth access device based on a resource in the resource pool.

504: The control device sends the configuration information to the fourth access device.

The configuration information is used by the fourth access device to work normally in the default-type fabric area.

Figure 17:
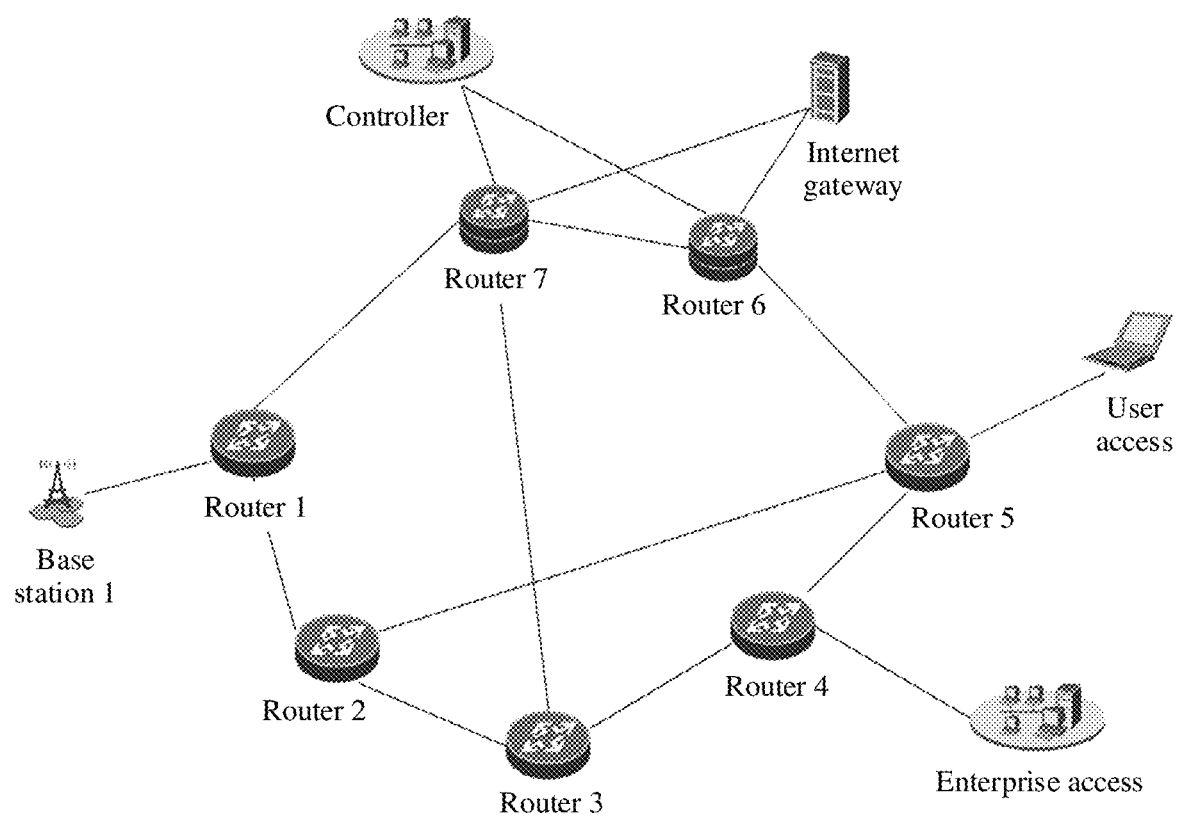
FIG. 17 is a schematic diagram of an example of a single-layer network according to an embodiment.

As shown in FIG. 17, if a newly added device in the fabric plane is a router 7, the control device sends configuration information to a router 7, so that the router 7 can work normally in the default-type fabric area.

The foregoing describes a process in which the device in the simple network goes online, and a process in which the device goes offline may actually include the following.

When a fifth access device in the default-type fabric area goes offline, the control device determines changed configuration information of a changed network element, where the changed network element is a network element whose configuration information changes because the fifth access device goes offline.

The control device sends the changed configuration information to the changed network element, where the changed configuration information is used by the changed network element to perform automatic update configuration.

In addition, when a fifth access device goes offline in the default-type fabric area, the control device obtains a link relationship of the fifth access device.

The control device deletes the fifth access device and the link relationship corresponding to the fifth access device in a first sparse connection diagram corresponding to the default-type fabric area and re-establishes a link relationship of remaining devices in the first sparse connection diagram, to obtain a second sparse connection diagram.

For the simple single-layer network, device online and offline can be automatically managed by dividing the default-type fabric area, so that network management efficiency is improved.

4. The automatic online process of the VM accessing the DC network, the automatic online process of the VM-based service, and the VM migration process.

A VPN service of the DC network is based on a virtual machine (virtual machine, VM). The following describes a management process of the DC network with reference to a VM online process and a VM migration process.

Figure 18:
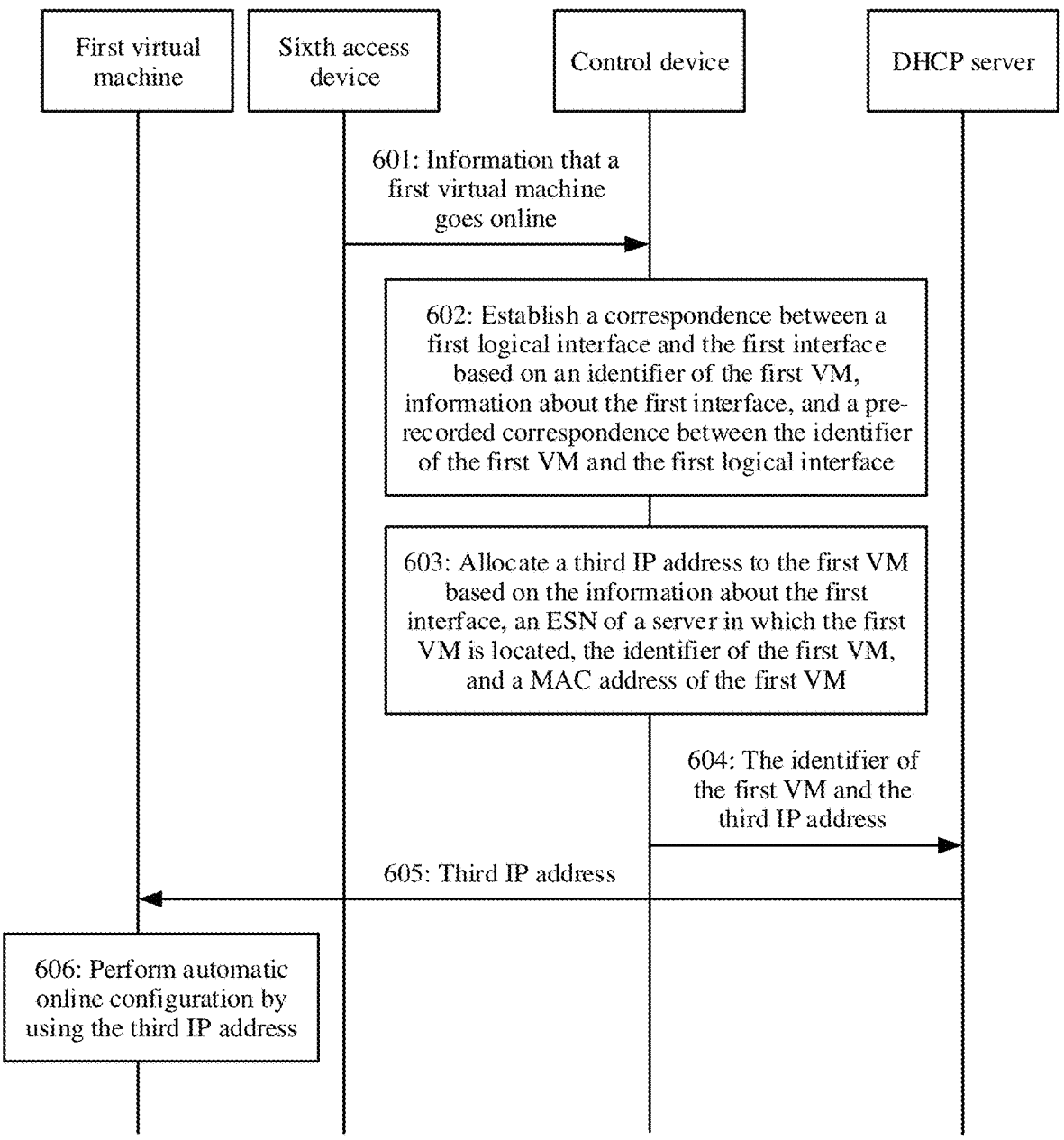
FIG. 18 is a schematic diagram of another embodiment of a network management according to an embodiment.

As shown in FIG. 18, an embodiment of network management may include the following steps.

601: The control device obtains information indicating that a first virtual machine VM goes online.

The information indicating that a first VM goes online includes information about a first interface of a sixth access device accessed by the first virtual machine in a data center-type fabric area, an ESN of a server in which the first VM is located, an identifier of the first VM, and a media access control (MAC) address of the first VM.

602: The control device establishes a correspondence between the first logical interface and the first interface based on the identifier of the first VM, the information about the first interface, and a pre-recorded correspondence between the identifier of the first VM and a first logical interface.

The control device determines, based on the information about the first interface, the ESN of the server in which the first VM is located, the identifier of the first VM, and the MAC address of the first VM, a resource pool associated with a fabric plane to which the sixth access device belongs. The resource pool includes an IP address that can be allocated to the fabric plane to which the sixth access device belongs.

The control device allocates a third IP address to the first VM based on the resource pool.

603: The control device allocates a third IP address to the first VM based on the information about the first interface, the ESN of the server in which the first VM is located, the identifier of the first VM, and the MAC address of the first VM.

604: The control device sends the identifier of the first VM and the third IP address to a DHCP server.

605: The DHCP server transmits the third IP address to the first VM by using the sixth access device.

606: The first virtual machine performs automatic online configuration by using the third IP address.

Figure 19:
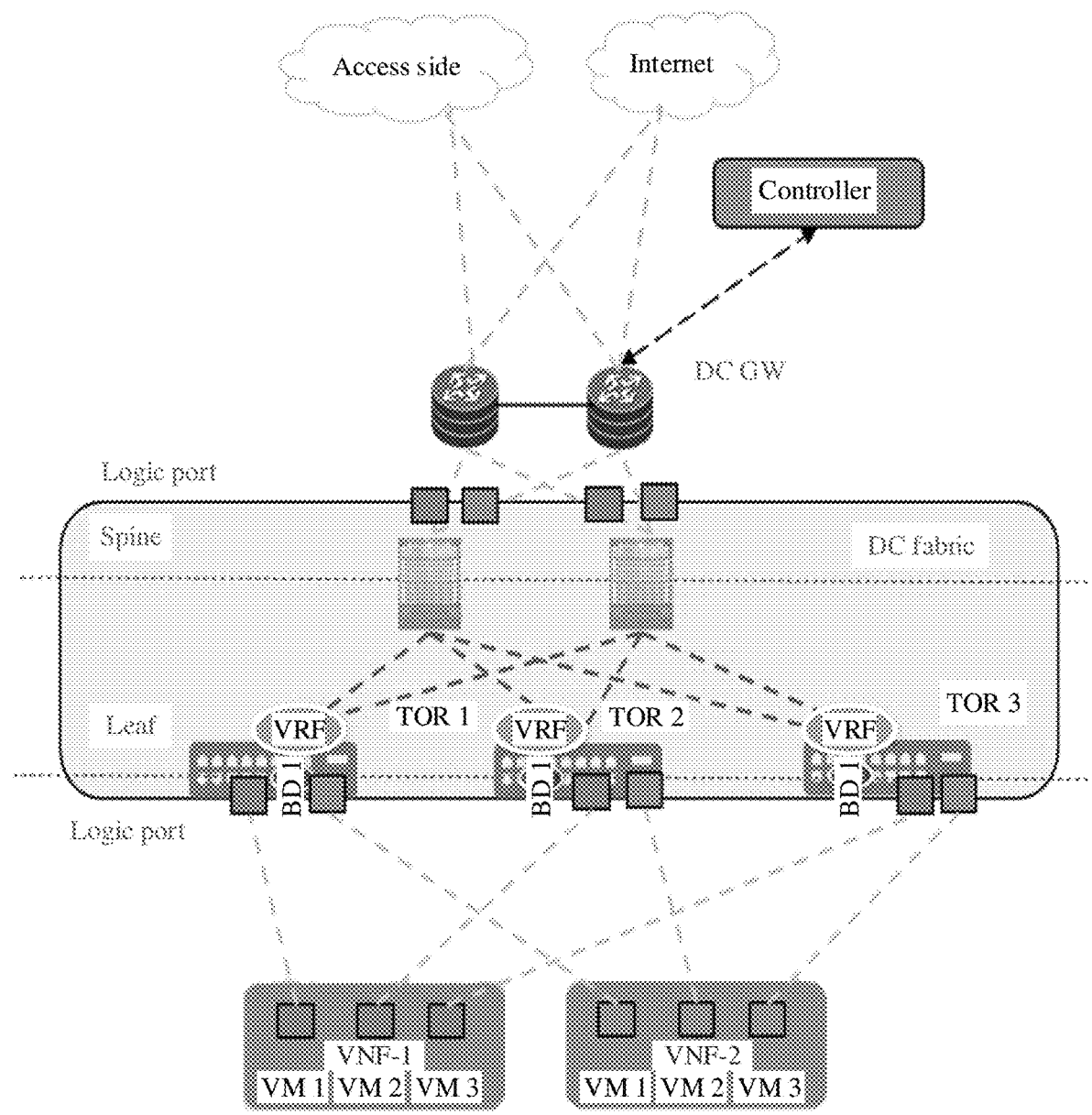
FIG. 19 is a schematic diagram of an example of a DC network according to an embodiment.

Using FIG. 19 as an example, FIG. 19 is a schematic structural diagram of a DC network. If a VM 1 in a virtual machine network function (virtual network function, VNF) 1 in FIG. 19 represents a first virtual machine, the VM 1 accesses a DC-type fabric area by using a TOR 1, the TOR 1 may report information indicating that a VM 1 goes online to a controller by using a spine node and a data center gateway in FIG. 19, and then the controller allocates a third IP address to the VM 1 through the foregoing process performed by the control device, where the third IP address is used for automatic online configuration of the VM 1.

After the first VM goes online, an automatic online process of a VPN service may be implemented based on the first VM. The process may be understood with reference to FIG. 20.

Figure 20:
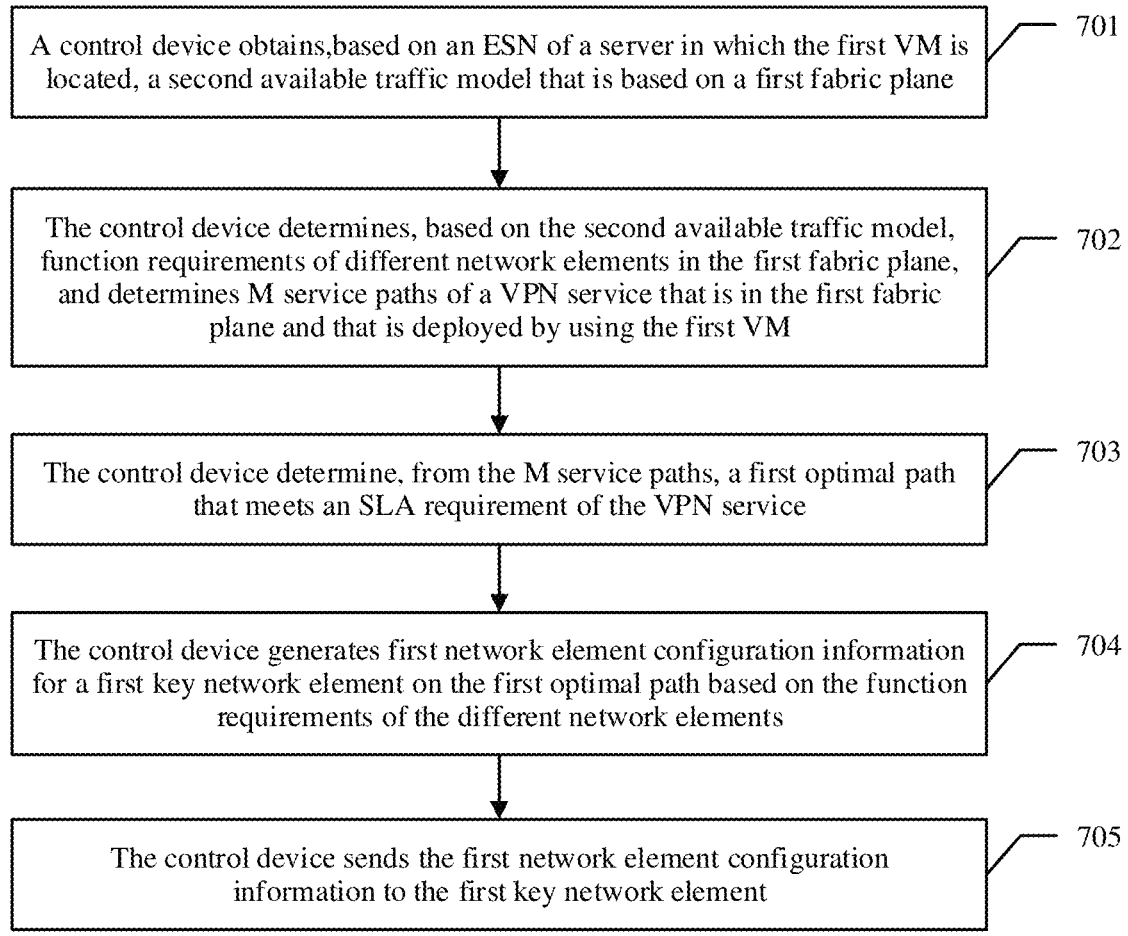
FIG. 20 is a schematic diagram of another embodiment of a network management according to an embodiment.

As shown in FIG. 20, the process of implementing automatic online of a VPN service based on the first VM provided in this embodiment may include the following steps.

701: The control device obtains, based on an ESN of a server in which the first VM is located, a second available traffic model that is based on the first fabric plane.

The second available traffic model includes a traffic sub-model for communication between the VM and the internet and a traffic sub-model for communication between VMs.

702: The control device determines, based on the second available traffic model, function requirements of different network elements on the first fabric plane, and determines M service paths of a VPN service deployed by using the first VM on the first fabric plane.

The different function requirements correspond to different traffic sub-models, each traffic sub-model corresponds to one set of configuration templates, and M is an integer greater than 0.

703: The control device determines, from the M service paths, a first optimal path that meets an SLA requirement of the VPN service.

704: The control device generates first network element configuration information for a first key network element on the first optimal path based on the function requirements of the different network elements.

The first network element configuration information includes a configuration template corresponding to a traffic sub-model to which the first key network element belongs.

705: The control device sends the first network element configuration information to the first key network element.

The first network element configuration information is used by the first key network element to perform automatic configuration.

Because the VM is a piece of virtualized resource, the VM may be migrated. After the service is deployed based on the first VM, the service is also migrated along with the migration of the first VM.

A virtual machine migration process may include:
if obtaining that the first VM is migrated to a second interface, the control device deletes a correspondence between a first logical interface and a first interface, where the second interface is an interface on a sixth access device or a seventh access device;
the control device determines, based on the second interface, N service paths of the VPN service deployed by using the first VM after the migration on the first fabric plane, where the different function requirements correspond to different traffic sub-models, each traffic sub-model corresponds to one set of configuration templates, and N is an integer greater than 0;

the control device determines, from the N service paths, a second optimal path that meets the SLA requirement of the VPN service;
the control device generates second network element configuration information for a second key network element on the second optimal path based on the function requirements of the different network elements, where the second network element configuration information includes a configuration template corresponding to a traffic sub-model to which the second key network element belongs; and
the control device sends the second network element configuration information to the second key network element, where the first network element configuration information is used by the first key network element to perform automatic configuration.

In this embodiment, in a process in which the virtual machine automatically goes online, in a manner of binding a logical interface to an interface on an actual access device, one virtual machine can present only one logical interface to the external, and even if an internal physical interface changes, a user is unaware of the change, so that external presentation is simplified.

For a traffic sub-model and a process of path selection that are involved in the VM online process and the VM-based service online process, refer to corresponding descriptions in the base station online process and the automatic service online process for understanding. Details are not described herein again.

The foregoing describes a network management method. The following describes, with reference to accompanying drawings, a control device for performing the foregoing network management in an embodiment.

Figure 21:
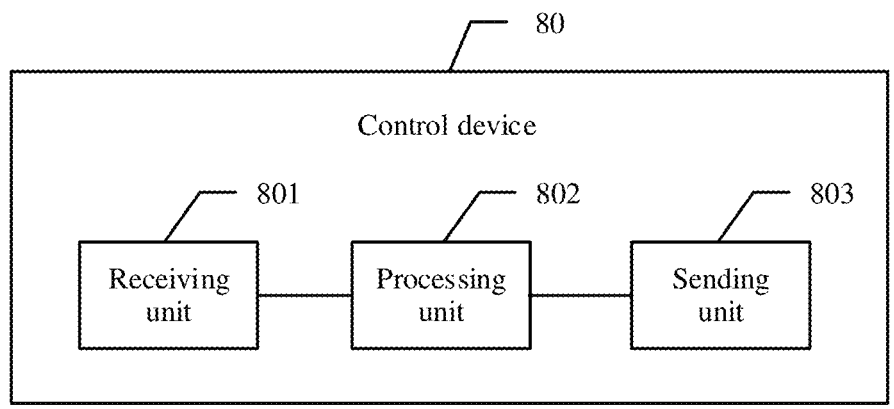
FIG. 21 is a schematic diagram of an embodiment of a control device according to an embodiment.

As shown in FIG. 21, an embodiment of a control device 80 provided in this embodiment may include:
a receiving unit 801, configured to receive information indicating that a device goes online, where the information indicating that a device goes online includes position information of an online device;
a processing unit 802, configured to: determine, based on the position information of the online device received by the receiving unit 801, that the online device belongs to or accesses a first fabric plane of a network topology within a network range managed by the control device, and determine configuration information of the online device based on the first fabric plane, where the network topology is planned as at least one fabric plane, and a forwarding resource associated with the first fabric plane is isolated from a forwarding resource outside the first fabric plane; and
a sending unit 803, configured to send the configuration information determined by the processing unit 802 to the online device, where the configuration information is used by the online device to perform automatic online configuration.

According to the solution provided in this embodiment, the control device may perform automatic management on the online device based on the fabric plane. After the device goes online, the control device may determine the configuration information for the online device, where the configuration information is used for automatic online configuration of the online device. In this way, automatic online management of the device is implemented, and network management efficiency is improved.

In a possible implementation, when the first fabric plane belongs to a bearer network, the first fabric plane includes an aggregation-type fabric area and an access-type fabric area.

When the first fabric plane belongs to a single-layer network, the first fabric plane includes a default-type fabric area;

when the first fabric plane belongs to a data center DC network, the first fabric plane includes a DC-type fabric area; or when the first fabric plane belongs to a cloud-network synergy network, the first fabric plane includes an aggregation-type fabric area, an access-type fabric area, and a DC-type fabric area.

In a possible implementation, the processing unit 802 is further configured to obtain template filtering information when the first fabric plane belongs to a bearer network or a cloud-network synergy network, and the online device is a first access device in the access-type fabric area.

The processing unit 802 is configured to:

determine, based on position information of the first access device, a first access-type fabric area to which the first access device belongs, and a role of the first access device in the first fabric area;

determine an online parameter template of the first access device and a preset network element login parameter;

allocate an interior gateway protocol IGP process number of the first access device, a link internet protocol IP address of the first access device, an identifier of the first access device, or a name of the first access device based on the first fabric area, where all devices included in the first fabric area belong to a same IGP domain; and fill the preset network element login parameter, a role of the first access device, the IGP process number, the link IP address of the first access device, the identifier of the first access device, or the name of the first access device into the online parameter template, to obtain configuration information used by the first access device to go online.

In a possible implementation, the processing unit 802 is further configured to: when a second access device in the first fabric area goes offline, determine changed configuration information of a changed network element, where the changed network element is a network element whose configuration information changes because the second access device goes offline.

The sending unit 803 is further configured to send the configuration change information, where the configuration change information is used by the changed network element to perform automatic update configuration.

In a possible implementation, the processing unit 802 is further configured to:

when the first fabric plane belongs to the bearer network or the cloud-network synergy network, the online device is a first base station in the access-type fabric area, the position information is interface information of a third access device that is accessed by the first base station in the access-type fabric area, and the online information further includes an electronic serial number ESN of the first base station, determine configuration information based on the interface information of the third access device and the ESN of the first base station, where the configuration information includes: a first IP address and a first mask that are allocated to the first base station based on the first fabric plane, and a second IP address and a second mask that are allocated to an interface indicated by the interface information, and the first IP address and the second IP address belong to a same network segment.

the sending unit 803 is configured to:

send the ESN, the first IP address, and the first mask of the first base station to a dynamic host configuration protocol DHCP server, where the first IP address and the first mask are transmitted by the DHCP server to the first base station by using the third access device, and the first IP address and the first mask are used by the first base station to perform automatic online configuration; and send the second IP address and the second mask to the third access device, where the second IP address and the second mask are used by the interface of the third access device to perform interworking configuration with the first base station.

In a possible implementation, the processing unit 802 is further configured to:

obtain, based on the ESN of the first base station, a first available traffic model that is based on the first fabric plane of the bearer network, where the first available traffic model includes a traffic sub-model for communication between a base station and the internet, a network management traffic sub-model, and a traffic sub-model for communication between base stations;

determine function requirements of different network elements on the first fabric plane based on the first available traffic model, and determine at least one service path that is on the first fabric plane and that satisfies a virtual private network VPN service deployed by using the first base station, where different function requirements correspond to different traffic sub-models, and each traffic sub-model corresponds to one set of configuration templates;

determine, from the at least one service path, an optimal path that meets a service level agreement SLA requirement of the VPN service; and generate network element configuration information for a key network element on the optimal path based on the function requirements of the different network elements, where the network element configuration information includes a configuration template corresponding to a traffic sub-model to which the key network element belongs.

The sending unit 803 is further configured to send the network element configuration information to the key network element, where the network element configuration information is used by the key network element to perform automatic configuration.

In a possible implementation, the processing unit 802 is configured to: when the first fabric plane belongs to the single-layer network and the online device is a fourth access device in the default-type fabric area, determine configuration information for the fourth access device based on the first fabric plane, where the configuration information includes an IGP process ID of the fourth access device, a link IP address of the fourth access device, an identifier of the fourth access device, or a name of the fourth access device.

In a possible implementation, the processing unit 802 is further configured to: when a fifth access device in the default-type fabric area goes offline, determine changed configuration information of a changed network element, where the changed network element is a network element whose configuration information changes because the fifth access device goes offline.

The sending unit 803 is further configured to send the changed configuration information to the changed network element, where the changed configuration information is used by the changed network element to perform automatic update configuration.

In a possible implementation, the processing unit 802 is configured to: when the first fabric plane belongs to a DC network or a cloud-network synergy network, and the online device is a first virtual machine VM in the DC-type fabric area, and the position information is information about a first interface of a sixth access device that is connected to the first virtual machine in the DC-type fabric area,
- establish a correspondence between the first logical interface and the first interface based on an identifier of the first VM, the information about the first interface, and a pre-recorded correspondence between the identifier of the first VM and a first logical interface; and
- determine configuration information for the first VM based on the information about the first interface, an ESN of a server in which the first VM is located, the identifier of the first VM, and a MAC address of the first VM, where the configuration information includes a third IP address.

The sending unit 803 is configured to send the identifier of the first VM and the third IP address to a DHCP server, where the third IP address is transmitted by the DHCP server to the first VM by using the sixth access device, and the third IP address is used by the first VM to perform automatic online configuration.

In a possible implementation, the processing unit 802 is further configured to:
- obtain, based on the ESN of the server in which the first VM is located, a second available traffic model that is based on the first fabric plane, where the second available traffic model includes a traffic sub-model for communication between the VM and the internet and a traffic sub-model for communication between VMs;
- determine function requirements of different network elements on the first fabric plane based on the second available traffic model, and determine M service paths of a VPN service deployed by using the first VM on the first fabric plane, where the different function requirements correspond to different traffic sub-models, each traffic sub-model corresponds to one set of configuration templates, and M is an integer greater than 0;
- determine, from the M service paths, a first optimal path that meets an SLA requirement of the VPN service; and
- generate first network element configuration information for a first key network element on the first optimal path based on the function requirements of the different network elements, where the first network element configuration information includes a configuration template corresponding to a traffic sub-model to which the first key network element belongs.

The sending unit 803 is further configured to send the first network element configuration information to the first key network element, where the first network element configuration information is used by the first key network element to perform automatic configuration.

In a possible implementation, the processing unit 802 is further configured to:
- if obtaining that the first VM is migrated to a second interface, delete the correspondence between the first logical interface and the first interface, where the second interface is an interface on the sixth access device or a seventh access device;
- determine, based on the second interface, N service paths of the VPN service deployed by using the first VM after the migration on the first fabric plane, where the different function requirements correspond to different traffic sub-models, each traffic sub-model corresponds to one set of configuration templates, and N is an integer greater than 0;
- determine, from the N service paths, a second optimal path that meets the SLA requirement of the VPN service; and
- generate second network element configuration information for a second key network element on the second optimal path based on the function requirements of the different network elements, where the second network element configuration information includes a configuration template corresponding to a traffic sub-model to which the second key network element belongs.

The sending unit 803 is further configured to send the second network element configuration information to the second key network element, where the first network element configuration information is used by the first key network element to perform automatic configuration.

It should be noted that, because the control device described above is based on a same concept as the method embodiments, effects brought by the control device are the same as those brought by the method embodiments The embodiments further provide a computer storage medium. The computer storage medium stores a program. The program is executed to perform some or all of the steps described in the method embodiments.

Figure 22:
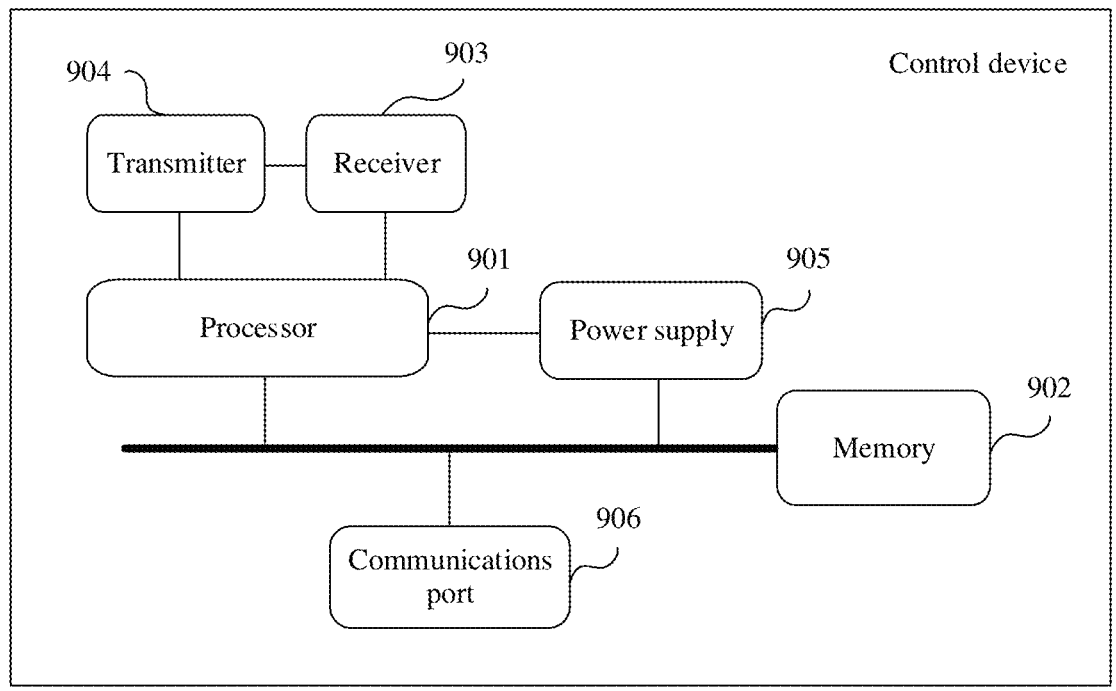
FIG. 22 is a schematic diagram of another embodiment of a control device according to an embodiment.

FIG. 22 is a schematic structural diagram of still another control device according to an embodiment. The control device may be a server or may be another device that can implement a function. The control device may include a processor 901 (for example, a CPU), a memory 902, a transmitter 904, and a receiver 903. The transmitter 904 and the receiver 903 are coupled to the processor 901, and the processor 901 controls a sending action of the transmitter 904 and a receiving action of the receiver 903. The memory 902 may include a high-speed RAM memory, and may further include a nonvolatile memory NVM, for example, at least one magnetic disk memory. The memory 902 may store various instructions, to complete various processing functions and implement the method steps in the embodiments. Optionally, the control device in this embodiment may further include one or more of a power supply 905 and a communications port 906. The components described in FIG. 22 may be connected by using a communications bus or may be connected by using another connection manner. This is not limited in this embodiment. The receiver 903 and the transmitter 904 may be integrated into a transceiver of the control device or may be separate receive and transmit antennas on the control device. The communications bus is configured to implement communication connections between components. The communications port 906 is configured to implement a connection and communication between the control device and another peripheral.

In some embodiments, the memory 902 is configured to store computer-executable program code, and the program code includes an instruction. When the processor 901 executes the instruction, the processor 901 in the control device may perform an action performed by the processing unit 802 in FIG. 21, and the receiver 903 or the communications port 906 in the control device may perform an action performed by the receiving unit 801 in FIG. 21. The transmitter 904 or the communications port 906 in the control device may perform an action performed by the sending unit 803 in FIG. 21. An implementation principle are similar. Details are not described herein again.

A chip system includes a processor, configured to support the foregoing control device in implementing a function related to the control device, for example, receiving or processing data and/or information in the foregoing method embodiments. The chip system may further include a memory. The memory is configured to store a program instruction and data that are necessary for a computer device. The chip system may include a chip or may include a chip and another discrete component.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit 802, or each of the units may exist alone physically, or two or more units are integrated into one unit. The integrated unit may be implemented in a form of hardware or may be implemented in a form of a software functional unit.

When the integrated unit is implemented in the form of a software functional unit and sold or used as an independent product, the integrated unit may be stored in a computer-readable storage medium. Based on such an understanding, the solutions essentially, or the part contributing to the conventional technology, or all or some of the solutions may be implemented in the form of a software product. The software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the solutions, but not for limiting. Although described in detail with reference to the foregoing embodiments, persons of ordinary skill in the art should understand that they may still make modifications to the solutions described in the foregoing embodiments or make equivalent replacements to some features thereof, without departing from the spirit and scope of the solutions of the embodiments.

What is claimed is:

1. A network management method, comprising:
   receiving, by a control device, information indicating that a device goes online, wherein the information indicating that the device goes online comprises position information of the online device;
   determining, by the control device based on the position information of the online device, that the online device belongs to or accesses a first fabric plane of a network topology within a network range managed by the control device, wherein the network topology is planned as at least one fabric plane, and a forwarding resource associated with the first fabric plane is isolated from a forwarding resource outside the first fabric plane;
   determining, by the control device, configuration information of the online device based on the first fabric plane; and
   sending, by the control device, the configuration information to the online device, wherein the configuration information is used by the online device to perform automatic online configuration.

2. The network management method according to claim 1, wherein
   when the first fabric plane belongs to a bearer network, the first fabric plane comprises an aggregation-type fabric area and an access-type fabric area;
   when the first fabric plane belongs to a single-layer network, the first fabric plane comprises a default-type fabric area;
   when the first fabric plane belongs to a data center (DC) network, the first fabric plane comprises a DC-type fabric area; or
   when the first fabric plane belongs to a cloud-network synergy network, the first fabric plane comprises the aggregation-type fabric area, the access-type fabric area, and the DC-type fabric area.

3. The network management method according to claim 2, wherein when the first fabric plane belongs to the bearer network or the cloud-network synergy network, and the online device is a first access device in the access-type fabric area, the method further comprises:

obtaining, by the control device, template filtering information; and the determining, by the control device, configuration information of the online device based on the first fabric plane comprises:

determining, by the control device based on position information of the first access device, a first access-type fabric area to which the first access device belongs, and a role of the first access device in the first access-type fabric area;

determining, by the control device, an online parameter template of the first access device and a preset network element login parameter based on the template filtering information;

allocating, by the control device, an interior gateway protocol (IGP) process number of the first access device, a link internet protocol (IP) address of the first access device, an identifier of the first access device, or a name of the first access device based on the first access-type fabric area, wherein all devices comprised in the first access-type fabric area belong to a same IGP domain; and filling, by the control device, the preset network element login parameter, the role of the first access device, the IGP process number, the link IP address of the first access device, the identifier of the first access device, or the name of the first access device into the online parameter template, to obtain configuration information used by the first access device to go online.

4. The network management method according to claim 3, wherein the method further comprises:

when a second access device in the first fabric area goes offline, determining, by the control device, changed configuration information of a changed network element, wherein the changed network element is a network element whose configuration information changes because the second access device goes offline; and sending, by the control device, the changed configuration information to the changed network element, wherein the changed configuration information is used by the changed network element to perform automatic update configuration.

5. The network management method according to claim 2, wherein when the first fabric plane belongs to the bearer network or the cloud-network synergy network, the online device is a first base station in the access-type fabric area, the position information is interface information of a third access device connected to the first base station in the access-type fabric area, and the online information further comprises an electronic serial number (ESN) of the first base station, the determining, by the control device, configuration information of the online device based on the first fabric plane comprises:

determining, by the control device, the configuration information based on the interface information of the third access device and the ESN of the first base station, wherein the configuration information comprises: a first IP address and a first mask that are allocated to the first base station based on the first fabric plane, and a second IP address and a second mask that are allocated to an interface indicated by the interface information, and the first IP address and the second IP address belong to a same network segment; and the sending, by the control device, the configuration information to the online device, wherein the configuration information is used by the online device to perform automatic online configuration comprises:

sending, by the control device, the ESN, the first IP address, and the first mask of the first base station to a dynamic host configuration protocol (DHCP) server, wherein the first IP address and the first mask are transmitted by the DHCP server to the first base station by using the third access device, and the first IP address and the first mask are used by the first base station to perform automatic online configuration; and sending, by the control device, the second IP address and the second mask to the third access device, wherein the second IP address and the second mask are used by the interface of the third access device to perform interworking configuration with the first base station.

6. The network management method according to claim 5, wherein the method further comprises:

obtaining, by the control device based on the ESN of the first base station, a first available traffic model that is based on the first fabric plane of the bearer network, wherein the first available traffic model comprises a traffic sub-model for communication between the first base station and the internet, a network management traffic sub-model, and a traffic sub-model for communication between base stations;

determining, by the control device, function requirements of different network elements on the first fabric plane based on the first available traffic model, and determining at least one service path that is on the first fabric plane and that satisfies a virtual private network (VPN) service deployed by using the first base station, wherein different function requirements correspond to different traffic sub-models, and each traffic sub-model corresponds to one set of configuration templates;

determining, by the control device from the at least one service path, an optimal path that meets a service level agreement (SLA) requirement of the VPN service;

generating, by the control device, network element configuration information for a key network element on the optimal path based on the function requirements of the different network elements, wherein the network element configuration information comprises a configuration template corresponding to a traffic sub-model to which the key network element belongs; and sending, by the control device, the network element configuration information to the key network element, wherein the network element configuration information is used by the key network element to perform automatic configuration.

7. The network management method according to claim 2, wherein when the first fabric plane belongs to the single-layer network, and the online device is a fourth access device in the default-type fabric area, the determining, by the control device, configuration information of the online device based on the first fabric plane comprises:

determining, by the control device, the configuration information for the fourth access device based on the first fabric plane, wherein the configuration information comprises an IGP process number of the fourth access device, a link IP address of the fourth access device, an identifier of the fourth access device, or a name of the fourth access device.

8. The network management method according to claim 7, wherein the method further comprises:
- when a fifth access device in the default-type fabric area goes offline, determining, by the control device, changed configuration information of a changed network element, wherein the changed network element is a network element whose configuration information changes because the fifth access device goes offline; and
- sending, by the control device, the changed configuration information to the changed network element, wherein the changed configuration information is used by the changed network element to perform automatic update configuration.

9. The network management method according to claim 2, wherein when the first fabric plane belongs to the DC network or the cloud-network synergy network, the online device is a first virtual machine (VM) in the DC-type fabric area, the position information is information about a first interface of a sixth access device connected to the first virtual machine in the DC-type fabric area, and the information about the device goes online further comprises an ESN of a server in which the first VM is located, an identifier of the first VM, and a medium access control (MAC) address of the first VM, the determining, by the control device, configuration information of the online device based on the first fabric plane comprises:
- establishing, by the control device, a correspondence between a first logical interface and the first interface based on the identifier of the first VM, the information about the first interface, and a pre-recorded correspondence between the identifier of the first VM and the first logical interface; and
- determining, by the control device, the configuration information for the first VM based on the information about the first interface, the ESN of the server in which the first VM is located, the identifier of the first VM, and the MAC address of the first VM, wherein the configuration information comprises a third IP address; and
- the sending, by the control device, the configuration information to the online device, wherein the configuration information is used by the online device to perform automatic online configuration comprises:
- sending, by the control device, the identifier of the first VM and the third IP address to a DHCP server, wherein the third IP address is transmitted by the DHCP server to the first VM by using the sixth access device, and the third IP address is used by the first VM to perform automatic online configuration.

10. The network management method according to claim 9, wherein the method further comprises:
- obtaining, by the control device based on the ESN of the server in which the first VM is located, a second available traffic model that is based on the first fabric plane, wherein the second available traffic model comprises a traffic sub-model for communication between the VM and the internet and a traffic sub-model for communication between VMs;
- determining, by the control device, function requirements of different network elements on the first fabric plane based on the second available traffic model, and determining M service paths of a VPN service deployed by using the first VM on the first fabric plane, wherein the different function requirements correspond to different traffic sub-models, each traffic sub-model corresponds to one set of configuration templates, and M is an integer greater than 0;
- determining, by the control device from the M service paths, a first optimal path that meets an SLA requirement of the VPN service;
- generating, by the control device, first network element configuration information for a first key network element on the first optimal path based on the function requirements of the different network elements, wherein the first network element configuration information comprises a configuration template corresponding to a traffic sub-model to which the first key network element belongs; and
- sending, by the control device, the first network element configuration information to the first key network element, wherein the first network element configuration information is used by the first key network element to perform automatic configuration.

11. The network management method according to claim 9, wherein the method further comprises:
- after the first VM is migrated to a second interface, deleting, by the control device, the correspondence between the first logical interface and the first interface, wherein the second interface is an interface on the sixth access device or a seventh access device;
- determining, by the control device based on the second interface, N service paths of the VPN service deployed by using the first VM after the migration on the first fabric plane, wherein the different function requirements correspond to different traffic sub-models, each traffic sub-model corresponds to one set of configuration templates, and N is an integer greater than 0;
- determining, by the control device from the N service paths, a second optimal path that meets the SLA requirement of the VPN service;
- generating, by the control device, second network element configuration information for a second key network element on the second optimal path based on the function requirements of the different network elements, wherein the second network element configuration information comprises a configuration template corresponding to a traffic sub-model to which the second key network element belongs; and
- sending, by the control device, the second network element configuration information to the second key network element, wherein the second network element configuration information is used by the second key network element to perform automatic configuration.

12. An apparatus, comprising:
at least one processor;
one or more memories coupled to the at least one processor and configured to store instructions which, when executed by the at least one processor, to cause the apparatus to:
receive information indicating that a device goes online, wherein the information indicating that the device goes online comprises position information of the online device;
determine, based on the position information of the online device received by the receiving unit, that the online device belongs to or accesses a first fabric plane of a network topology within a network range managed by a control device;
determine configuration information of the online device based on the first fabric plane, wherein the network topology is planned as at least one fabric plane, and a forwarding resource associated with the first fabric plane is isolated from a forwarding resource outside the first fabric plane; and send the configuration information determined by the processing unit to the online device, wherein the configuration information is used by the online device to perform automatic online configuration.

13. The apparatus according to claim 12, wherein when the first fabric plane belongs to a bearer network, the first fabric plane comprises an aggregation-type fabric area and an access-type fabric area;

when the first fabric plane belongs to a single-layer network, the first fabric plane comprises a default-type fabric area;

when the first fabric plane belongs to a data center (DC) network, the first fabric plane comprises a DC-type fabric area; or when the first fabric plane belongs to a cloud-network synergy network, the first fabric plane comprises the aggregation-type fabric area, the access-type fabric area, and the DC-type fabric area.

14. The apparatus according to claim 13, wherein instructions executed by the at least one processor further cause the apparatus to:

obtain template filtering information when the first fabric plane belongs to the bearer network or the cloud-network synergy network, and the online device is a first access device in the access-type fabric area; and determine, based on position information of the first access device, a first access-type fabric area to which the first access device belongs, and a role of the first access device in the first access-type fabric area;

determine an online parameter template of the first access device and a preset network element login parameter;

allocate an interior gateway protocol (IGP) process number of the first access device, a link internet protocol (IP) address of the first access device, an identifier of the first access device, or a name of the first access device based on the first access-type fabric area, wherein all devices comprised in the first access-type fabric area belong to a same IGP domain; and fill the preset network element login parameter, a role of the first access device, the IGP process number, the link IP address of the first access device, the identifier of the first access device, or the name of the first access device into the online parameter template, to obtain configuration information used by the first access device to go online.

15. The apparatus according to claim 13, wherein the instructions executed by the at least one processor further cause the apparatus to: when the first fabric plane belongs to the bearer network or the cloud-network synergy network, the online device is a first base station in the access-type fabric area, the position information is interface information of a third access device that is accessed by the first base station in the access-type fabric area, and the online information further comprises an electronic serial number (ESN) of the first base station, determine configuration information based on the interface information of the third access device and the ESN of the first base station, wherein the configuration information comprises: a first IP address and a first mask that are allocated to the first base station based on the first fabric plane, and a second IP address and a second mask that are allocated to an interface indicated by the interface information, and the first IP address and the second IP address belong to a same network segment;

send the ESN, the first IP address, and the first mask of the first base station to a dynamic host configuration protocol (DHCP) server, wherein the first IP address and the first mask are transmitted by the DHCP server to the first base station by using the third access device, and the first IP address and the first mask are used by the first base station to perform automatic online configuration; and send the second IP address and the second mask to the third access device, wherein the second IP address and the second mask are used by the interface of the third access device to perform interworking configuration with the first base station.

16. The apparatus according to claim 15, wherein the instructions executed by the at least one processor further cause the apparatus to:

obtain, based on the ESN of the first base station, a first available traffic model that is based on the first fabric plane of the bearer network, wherein the first available traffic model comprises a traffic sub-model for communication between the first base station and the internet, a network management traffic sub-model, and a traffic sub-model for communication between base stations;

determine function requirements of different network elements on the first fabric plane based on the first available traffic model, determine at least one service path that is on the first fabric plane and that satisfies a virtual private network (VPN) service deployed by using the first base station, wherein different function requirements correspond to different traffic sub-models, and each traffic sub-model corresponds to one set of configuration templates, determine, from the at least one service path, an optimal path that meets a service level agreement (SLA) requirement of the VPN service; and generate network element configuration information for a key network element on the optimal path based on the function requirements of the different network elements, wherein the network element configuration information comprises a configuration template corresponding to a traffic sub-model to which the key network element belongs, and the sending unit is further configured to send the network element configuration information to the key network element, wherein the network element configuration information is used by the key network element to perform automatic configuration.

17. The apparatus according to claim 13, wherein the instructions executed by the at least one processor further cause the apparatus to: when the first fabric plane belongs to the single-layer network and the online device is a fourth access device in the default-type fabric area, determine configuration information for the fourth access device based on the first fabric plane, wherein the configuration information comprises an IGP process ID of the fourth access device, a link IP address of the fourth access device, an identifier of the fourth access device, or a name of the fourth access device.

18. The apparatus according to claim 13, wherein the instructions executed by the at least one processor further cause the apparatus to: when the first fabric plane belongs to the DC network or the cloud-network synergy network, the online device is a first virtual machine (VM) in the DC-type fabric area, and the position information is information about a first interface of a sixth access device that is connected to the first virtual machine in the DC-type fabric area, establish a correspondence between the first logical interface and the first interface based on an identifier of the first VM, the information about the first interface, and a pre-recorded correspondence between the identifier of the first VM and a first logical interface, determine configuration information for the first VM based on the information about the first interface, an ESN of a server in which the first VM is located, the identifier of the first VM, and a MAC address of the first VM, wherein the configuration information comprises a third IP address, and send the identifier of the first VM and the third IP address to a DHCP server, wherein the third IP address is transmitted by the DHCP server to the first VM by using the sixth access device, and the third IP address is used by the first VM to perform automatic online configuration.

19. The apparatus according to claim 18, wherein the instructions executed by the at least one processor further cause the apparatus to:

obtain, based on the ESN of the server in which the first VM is located, a second available traffic model that is based on the first fabric plane, wherein the second available traffic model comprises a traffic sub-model for communication between the VM and the internet and a traffic sub-model for communication between VMs;

determine function requirements of different network elements on the first fabric plane based on the second available traffic model, and determine M service paths of a VPN service deployed by using the first VM on the first fabric plane, wherein the different function requirements correspond to different traffic sub-models, each traffic sub-model corresponds to one set of configuration templates, and M is an integer greater than 0;

determine, from the M service paths, a first optimal path that meets an SLA requirement of the VPN service; and generate first network element configuration information for a first key network element on the first optimal path based on the function requirements of the different network elements, wherein the first network element configuration information comprises a configuration template corresponding to a traffic sub-model to which the first key network element belongs; and the sending unit is further configured to send the first network element configuration information to the first key network element, wherein the first network element configuration information is used by the first key network element to perform automatic configuration.

20. The apparatus according to claim 18, wherein the instructions executed by the at least one processor further cause the apparatus to:

after the first VM is migrated to a second interface, delete the correspondence between the first logical interface and the first interface, wherein the second interface is an interface on the sixth access device or a seventh access device, determine, based on the second interface, N service paths of the VPN service deployed by using the first VM after the migration on the first fabric plane, wherein the different function requirements correspond to different traffic sub-models, each traffic sub-model corresponds to one set of configuration templates, and N is an integer greater than 0, determine, from the N service paths, a second optimal path that meets the SLA requirement of the VPN service, generate second network element configuration information for a second key network element on the second optimal path based on the function requirements of the different network elements, wherein the second network element configuration information comprises a configuration template corresponding to a traffic sub-model to which the second key network element belongs, and send the second network element configuration information to the second key network element, wherein the second network element configuration information is used by the second key network element to perform automatic configuration.

\* \* \* \* \*